US011170800B2

(12) United States Patent
McAlpine et al.

(10) Patent No.: US 11,170,800 B2
(45) Date of Patent: Nov. 9, 2021

(54) ADJUSTING USER EXPERIENCE FOR MULTIUSER SESSIONS BASED ON VOCAL-CHARACTERISTIC MODELS

(71) Applicant: MICROSOFT TECHNOLOGY LICENSING, LLC, Redmond, WA (US)

(72) Inventors: Roberta McAlpine, Lynnwood, WA (US); Christopher Edward Frederick Geddes, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/803,973

(22) Filed: Feb. 27, 2020

(65) Prior Publication Data
US 2021/0272584 A1    Sep. 2, 2021

(51) Int. Cl.
G10L 25/63    (2013.01)
A63F 13/215    (2014.01)
(Continued)

(52) U.S. Cl.
CPC ............ *G10L 25/63* (2013.01); *A63F 13/215* (2014.09); *G10L 15/08* (2013.01); *H04L 65/403* (2013.01)

(58) Field of Classification Search
CPC .... A61B 5/0533; A63F 13/212; A63F 13/215; A63F 13/67; G06F 3/016;
(Continued)

(56) References Cited

U.S. PATENT DOCUMENTS 7,577,757 B2    8/2009 Carter et al.
7,953,118 B2    5/2011 Krantz et al.
(Continued)

FOREIGN PATENT DOCUMENTS

EP    2800004 A1    11/2014
WO    2004008330 A1    1/2004
WO    2018152242 A1    8/2018

OTHER PUBLICATIONS

"Notice of Allowance Issued in U.S. Appl. No. 16/428,088", dated Sep. 4, 2020, 12 Pages.
(Continued)

*Primary Examiner* — Gerald Gauthier
(74) *Attorney, Agent, or Firm* — Holzer Patel Drennan

(57) ABSTRACT

Techniques for adjusting user experiences for participants of a multiuser session by deploying vocal-characteristic models to analyze audio streams received in association with the participants are disclosed herein. The vocal-characteristic models are used to identify emotional state indicators corresponding to certain vocal properties being exhibited by individual participants. Based on the identified emotional state indicators, probability scores are generated indicating a likelihood that individual participants are experiencing a predefined emotional state. For example, a specific participant's voice may be continuously received and analyzed using a vocal-characteristic model designed to detect whether vocal properties are consistent with a predefined emotional state. Probability scores may be generated based on how strongly the detected vocal properties correlate with the vocal-characteristic model. Responsive to the probability score that results from the vocal-characteristic model exceeding a threshold score, some remedial action may be performed with respect to the specific participant that is experiencing the predefined emotional state.

19 Claims, 9 Drawing Sheets

(51) Int. Cl.
  *G10L 15/08* (2006.01)
  *H04L 29/06* (2006.01)
(58) Field of Classification Search
  CPC ............ G06F 3/016167; G06F 3/0484; G06F 16/337; G06F 40/30; G06F 3/167; G06F 21/604; G06K 9/00355; G06K 9/00718; G06K 9/00744; G06N 5/025; G06N 5/04; G06N 20/00; G06Q 10/06; G06Q 10/1095; G06Q 50/01; G10L 15/08; G10L 15/30; G10L 17/22; G10L 25/63; G10L 25/84; G10L 17/26; H04L 65/403; H04L 12/1822; H04M 3/5233; H04M 1/72472
  USPC ........... 704/9, 236, 239, 240, 270; 705/7.39; 706/12
  See application file for complete search history.

(56) References Cited

U.S. PATENT DOCUMENTS

| | | | |
|---|---|---|---|
| 8,200,587 B2 | 6/2012 | Deyo | |
| 8,234,395 B2 | 7/2012 | Millington | |
| 8,386,251 B2* | 2/2013 | Strom | G10L 15/08 704/246 |
| 8,681,822 B2 | 3/2014 | Bradley et al. | |
| 8,825,479 B2* | 9/2014 | Krishnan | G10L 17/26 704/236 |
| 9,319,792 B1 | 4/2016 | Coleman et al. | |
| 10,242,501 B1* | 3/2019 | Pusch | G06T 7/70 |
| 10,366,347 B2 | 7/2019 | Tofighbakhsh | |
| 10,387,972 B2* | 8/2019 | O'Sullivan | G06Q 50/01 |
| 10,410,626 B1* | 9/2019 | Sherstinsky | G10L 15/063 |
| 10,737,185 B2* | 8/2020 | Fargo | A63F 13/54 |
| 10,755,712 B2* | 8/2020 | Kakkar | G10L 15/22 |
| 10,872,599 B1* | 12/2020 | Wu | G10L 15/063 |
| 2006/0285665 A1* | 12/2006 | Wasserblat | G06Q 20/4016 379/114.14 |
| 2008/0134282 A1 | 6/2008 | Fridman et al. | |
| 2009/0271251 A1* | 10/2009 | Sorensen | G06Q 30/02 348/14.01 |
| 2010/0042238 A1 | 2/2010 | Moore et al. | |
| 2011/0040155 A1 | 2/2011 | Guzak et al. | |
| 2012/0166195 A1* | 6/2012 | Hayakawa | G10L 17/26 704/240 |
| 2012/0278076 A1* | 11/2012 | Lloyd | G10L 15/22 704/240 |
| 2013/0132088 A1* | 5/2013 | Kim | A61B 5/165 704/270 |
| 2014/0098986 A1* | 4/2014 | Harrington | G11B 27/28 382/100 |
| 2014/0163960 A1* | 6/2014 | Dimitriadis | G10L 25/48 704/9 |
| 2014/0278412 A1* | 9/2014 | Scheffer | G10L 25/03 704/240 |
| 2014/0358520 A1 | 12/2014 | Davey | |
| 2015/0070516 A1 | 3/2015 | Shoemake et al. | |
| 2015/0193718 A1* | 7/2015 | Shaburov | G06Q 10/06395 705/7.39 |
| 2016/0019915 A1* | 1/2016 | Khan | G10L 19/018 704/239 |
| 2016/0027452 A1* | 1/2016 | Kalinli-Akbacak | G10L 25/63 704/240 |
| 2016/0162807 A1* | 6/2016 | Smailagic | G10L 25/63 706/12 |
| 2016/0379505 A1* | 12/2016 | el Kaliouby | G16H 20/70 434/236 |
| 2017/0046346 A1* | 2/2017 | Zhou | G06F 16/337 |
| 2018/0108358 A1* | 4/2018 | Humphreys | G10L 17/22 |
| 2018/0197150 A1* | 7/2018 | Bender | G06Q 10/1095 |
| 2018/0233136 A1 | 8/2018 | Torok et al. | |
| 2018/0233164 A1* | 8/2018 | Levanon | G10L 25/63 |
| 2018/0257236 A1* | 9/2018 | Sasagawa | G10L 15/08 |
| 2018/0315418 A1 | 11/2018 | Bolsakovas et al. | |
| 2018/0341877 A1* | 11/2018 | Panattoni | G06Q 50/01 |
| 2019/0005021 A1* | 1/2019 | Miller | G10L 15/26 |
| 2019/0052471 A1* | 2/2019 | Panattoni | A63F 13/53 |
| 2019/0109878 A1* | 4/2019 | Boyadjiev | G06F 40/30 |
| 2019/0206409 A1* | 7/2019 | Jung | G10L 17/00 |
| 2019/0251359 A1* | 8/2019 | Pranger | G06K 9/00302 |
| 2019/0279629 A1 | 9/2019 | Okamoto et al. | |
| 2019/0371344 A1* | 12/2019 | Noh | A61B 5/0533 |
| 2020/0014742 A1 | 1/2020 | Pollet | |
| 2020/0019420 A1* | 1/2020 | Saimani | G06N 5/04 |
| 2020/0059375 A1* | 2/2020 | Hewitt | H04L 12/1831 |
| 2020/0162602 A1* | 5/2020 | Rakshit | H04M 7/0033 |
| 2020/0184203 A1* | 6/2020 | Anders | G06K 9/00355 |
| 2020/0206631 A1* | 7/2020 | Sumant | G10L 15/1815 |
| 2020/0273485 A1* | 8/2020 | Jagmag | H04N 21/4667 |
| 2020/0379942 A1 | 12/2020 | Kakulamarri et al. | |
| 2020/0380389 A1* | 12/2020 | Eldeeb | G06F 16/9535 |
| 2021/0097168 A1* | 4/2021 | Patel | G06F 21/554 |

OTHER PUBLICATIONS

"International Search Report and Written Opinion Issued in PCT Application No. PCT/US20/029183", dated Jul. 17, 2020, 12 Pages.
"Universal Serial Bus Device Class Definition for Audio Devices", Retrieved From https://www.usb.org/developers/docs/devclass_docs/audio10.pdf, Mar. 18, 1998, 130 Pages.
"Configure or Change Reputation Score Factors and Weights", Retrieved from: https://community.telligent.com/community/8/w/user-documentation/47769/configure-or-change-reputation-score-factors-and-weights, Retrieved Date: Oct. 17, 2019, 4 Pages.
"Protect Your Community from Abusive User-Generated Content", Retrieved from: https://web.archive.org/web/20190826232641/https:/www.twohat.com/community-sift/, Aug. 26, 2019, 5 Pages.
"USB Audio Simplified", Retrieved from: https://web.archive.org/web/20170829194008/https:/www.silabs.com/documents/public/white-papers/usb-audio-simplified.pdf, Retrieved on: Aug. 29, 2017, pp. 1-5.
"Use of AI in Online Content Moderation", In Report of OFCOM, Jul. 18, 2019, 84 Pages.
David, "Play Same Song on Multiple Phones Simultaneously", Retrieved from: https://7labs.io/mobile/music-in-sync-on-multiple-devices.html, Apr. 15, 2019, 11 Pages.
Singh, Laxman, "Speakerblast: Play Same Music on Multiple Devices from any Location", Retrieved from: http://www.ilovefreesoftware.com/03/webware/speakerblast-play-same-music-on-multiple-devices.html, Feb. 3, 2014, 5 Pages.
Singh, Amanpreet, "USB Protocol: Types of USB Packets and USB Transfers (Part 2/6)", Retrieved from: https://www.engineersgarage.com/articles/usb-protocol-types-usb-packets-and-usb-transfers-part-26, Retrieved on: Apr. 15, 2019, 5 Pages.
Abramson, et al., "Non Provisional Application filed as U.S. Appl. No. 16/582,324", filed Sep. 25, 2019, 24 Pages.
"International Search Report and Written Opinion Issued in PCT Application No. PCT/US21/014058", dated Apr. 13, 2021, 13 Pages.

* cited by examiner

ADJUSTING USER EXPERIENCE FOR MULTIUSER SESSIONS BASED ON VOCAL-CHARACTERISTIC MODELS

BACKGROUND

A variety of multiuser virtual environment services enable persons that are geographically remote from one another to jointly participate in online virtual activities in multiuser sessions. As an example, an online multiplayer gaming service may facilitate a multiplayer gaming session that enables players of an online video game to compete against other geographically distant players. To enhance the players' immersion into a multiplayer gaming session, existing systems typically enable groups of players whom are participating in the multiuser gaming session to audibly communicate with one another using an in-session voice "chat" functionality.

Some multiuser sessions having such in-session voice "chat" functionality are largely anonymous in the sense that individual participants are identifiable by screen name only. The anonymity of these multiuser sessions has the unfortunate side effect of online disinhibition wherein some peoples' behavior is markedly worse online than it otherwise would be in real-life (e.g., face-to-face) situations. This may be due to a lack of perceivable repercussions resulting from aggressive or rude behavior. For example, some participants find it all too easy to relentlessly use profane language or even hurl insults at other participants during a multiuser session with little regard for the emotional harm such behavior may cause to others. In some cases, a participant may not even be aware that his or her behavior is causing emotional distress to other participants of a multiuser session. For example, a participant using the in-session voice "chat" functionality during a multiplayer gaming session may use profanity without malicious intent but while being ignorant that such profanity is causing sadness or disgust for another participant within that multiplayer gaming session. In extreme cases, an individual participant may experience fear due to being insulted or threatened by another participant.

It is with respect to these considerations and others that the disclosure made herein is presented.

SUMMARY

This disclosure describes systems and techniques for adjusting a user experience for individual participants of a multiuser session by deploying vocal-characteristic models to analyze audio streams being received in association with the individual participants of the multiuser session. Generally described, the vocal-characteristic models may be used to analyze the audio streams in order to identify emotional state indicators corresponding to certain vocal properties being exhibited by the individual participants.

Based on the identified emotional state indicators, probability scores may then be generated. The probability scores can indicate a likelihood or probability that a specific participant is experiencing some predefined emotional state. For example, an audio stream of the specific participant's voice may be continuously received via an in-session voice "chat" functionality and may be analyzed using a vocal-characteristic model that is specifically designed to detect vocal properties which are consistent with predefined emotional states. These emotional states can include, for example, fear, sadness, anger, or disgust. Probability scores may be generated based on how strongly the detected vocal properties correlate with the vocal-characteristic model.

In some examples, responsive to the probability score that results from the vocal-characteristic model exceeding a threshold score (a.k.a. a threshold level), some remedial action may be performed with respect to the specific participant that is experiencing the predefined emotional state. Additionally, or alternatively, a remedial action(s) may be performed with respect to some other participant that is causing the specific participant to experience the predefined emotional state. In this way, the systems and techniques described herein are usable to proactively react to the emotional state of participants of a multiuser session to improve these participants' overall user experience. In some examples, the system may respond to a particular emotional state being detected in a first participant's voice by proactively performing some remedial action with respect to one or more other participants of the multiuser session. For example, the system may respond to fear being detected in a first participant's voice by muting and/or transmitting a warning to a second participant which anger is being detected in the voice of Stated alternatively, the disclosed technologies enable real-time moderation of in-session voice chats to reduce the "toxicity" that these participants are exposed to over social channels by reacting to emotions that can be detected within participants' voices.

In some examples described herein, a multiuser session may be a multiplayer gaming session that is facilitated by a virtual environment service (e.g., an online multiplayer gaming service) to enable players of an online video game to compete against other geographically distant players. Generally described, an online multiplayer gaming service may facilitate the multiplayer gaming session by exposing program code to a plurality of client devices (e.g., laptop computers, gaming consoles, etc.) thereby enabling the players to utilize their respective client devices to engage with game content. In various examples described herein, the program code exposed by the online multiplayer gaming service is executable to facilitate a multiplayer gaming session (e.g., by generating the game content) and also to provide communications functionality (e.g., via an application programming interface that provides access to an in-session voice "chat" functionality). In this way, the participants in the multiplayer gaming session can exchange live voice-based communications with one another while simultaneously and jointly playing the game.

The live voice-based communications may be received by the virtual environment service as audio streams are continuously uploaded from the client devices being used to participate in the multiplayer gaming session. For example, the individual client devices may each be equipped with input/output devices to simultaneously capture audio data using a microphone (e.g., an input device) while also playing audio data, that is captured at other ones of the client devices, via speakers (e.g., an output device). In this way, the various participants that are playing in the multiplayer gaming session may converse with one another while playing the online video game. Thus, it will be appreciated that the audio data that is received by the virtual environment service may receive a first audio stream that corresponds to a first participant (e.g., user) and a second audio stream that corresponds to a second participant.

In some examples, upon receiving the audio streams from the various client devices, the virtual environment service may analyze individual ones of the audio streams using a plurality of different vocal-characteristic models. Generally described, individual vocal-characteristic models may be designed to detect certain vocal properties that are consistent with predefined emotional states. The vocal-characteristic models may be generated by training machine learning algorithms using voice conversations that have been tagged in terms of sentiment and have been categorized in terms of predefined emotions that are displayed. For example, a suitable sample of recorded conversations (e.g., 30 hours or more) may be individually tagged as having a sentiment value of positive, neutral, or negative and may further be categorized as being representative of specific emotional states such as, for example, anger, sadness, apprehension, or disgust. In this way, the machine learning algorithm may "learn" to identify certain vocal properties that are consistently exhibited across groups of sample conversations that are categorized as being representative of specific emotional states and, therefore, serve as emotional state indicators for the specific emotional states.

By analyzing the audio streams using the various vocal-characteristic models, the virtual environment service may identify emotional state indicators associated with the various predefined emotional states. In some examples, the virtual environment service may analyze an individual audio stream, that corresponds to a specific participant, with respect to a plurality of vocal-characteristic models. In doing so, the virtual environment service may identify within the individual audio stream emotional state indicators that correlate to (e.g., are indicative of, serve as "tells" to) the specific participant being in various predefined emotional states.

Based on the emotional state indicators that are identified using the various vocal-characteristic models, the virtual environment service may determine probability scores associated with the specific participant being in the various predefined emotional states—which the vocal-characteristic models are designed to detect certain vocal properties that are indicative thereof. To illustrate this point, presume that the virtual environment service is configured to analyze the audio stream for the specific participant using a first vocal-characteristic model that corresponds to a first predefined emotional state (e.g., fear) and also a second vocal-characteristic model that corresponds to a second predefined emotional state (e.g., frustration). Under these circumstances, the analysis of the audio stream with respect to the first vocal-characteristic model may yield a first probability score associated with the specific participant being in the first predefined emotional state and a second probability score associated with the specific participant being in the second predefined emotional state. For example, the first probability score may indicate a likelihood that the specific participant is currently fearful while the second probability score may indicate a likelihood that the specific participant is currently frustrated.

In some examples, the probability scores associated with the specific participant may be further based on various factors other than the analysis of that participant's voice (e.g., via a corresponding audio stream) with respect to the vocal-characteristic models. In some implementations, the probability scores associated with the specific participant being in any particular emotional state may be further based on an analysis of some other participant's audio stream using a vocal-characteristic model. To illustrate this point, suppose that an analysis of a first participant's audio stream using a "fear" vocal-characteristic model yields a probability score of eighty-five ("85") with respect to a "fear" emotional state. Further suppose that an analysis of a second participant's audio stream using an "aggression" vocal-characteristic model yields a probability score of ninety "90" with respect to an "aggressive" emotional state, and that this second participant is talking directly to the first participant.

Since the second participant's aggressive behavior toward the first participant may tend to increase the likelihood of the first participant feeling fearful, the virtual environment service may further account for the second participant's aggressive behavior in determining the first participant's probability score with respect to the "fear" emotional state. For example, the virtual environment service may alter (e.g., multiply by a factor of, add points to, subtract points from, etc.) the initial probability score of eighty-five ("85") that was determined based on the analysis of the first participant's audio stream using a "fear" vocal-characteristic model. Other factors which may be identified and considered/weighed in determining the probability scores associated with a specific participant may include, but are not limited to, whether another participant uses predetermined words or phrases, a reputation association with another user whom is talking to the specific participant, historical data indicating whether another participant has been rude or aggressive towards the specific participant in the past, or an age of the specific participant.

Based on the probability scores determined using the vocal-characteristic models (or other factors), the virtual environment service may utilize a rule set to select one or more remedial actions to perform with respect to one or more participants of the multiplayer gaming session. For example, in response to the probability score that is determined for the first participant in association with the "fear" emotional state exceeding a threshold score, an appropriate remedial action may be performed to reduce the fear being experience by the first participant. Continuing with the example outlined above, a suitable remedial action may be to automatically mute the audio stream of the second participant to prevent the first participant from being exposed to the identified aggressive behavior.

Therefore, among many other benefits, the techniques herein improve efficiencies with respect to a wide range of computing resources. For instance, human interaction with a multiuser session may be improved because the use of the techniques disclosed herein enables a system to identify vocal properties being exhibited by individual participants which are indicative of these individual participants being emotionally distressed (e.g., angry, sad, fearful, etc.) and, ultimately, to proactively mitigate the emotional distress by performing suitable remedial actions. For example, in the event that vocal characteristics of a particular participant indicate a fearful state, the system may identify another participant that is behaving belligerently and/or aggressively toward the "fearful" participant and respond by blocking the "aggressive/belligerent" participants audio stream. As another example, if vocal characteristics of a particular participant indicate a frustrated state, the system may offer this participant with assistance or encouragement with respect to some aspect of the multiuser session.

In some implementations, the system may conserve computing resources (e.g., processing resources) by refraining from analyzing one or more audio streams with respect to one or more vocal-characteristic models unless a probability score that results from another audio stream reaches a threshold score. For example, upon a multiuser session being initiated, the system may continually analyze a first audio stream based on a first vocal-characteristic model but may refrain from analyzing a second audio stream. Then, if (and only if) the analysis of the first audio stream results in a probability score that exceeds a threshold score, the system may respond by beginning to analyze the second audio stream using the first vocal-characteristic model and/or a second vocal-characteristic model. As a specific but non-limiting example, the system may analyze the first audio stream from the beginning of the multiuser session to detect emotional state indicators consistent with a first user being fearful. Then, in the event that such emotional state indicators are identified to an extent such that the resulting probability score reaches a threshold score, then the system may begin to analyze the second audio stream to determine whether a second user is exhibiting "anger"—which would be a potential cause of the fearful state of the first user. In this way, processing resources may be conserved and used to analyze one or more audio streams only if some other audio stream(s) are indicative of a user being emotionally distressed.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-executable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
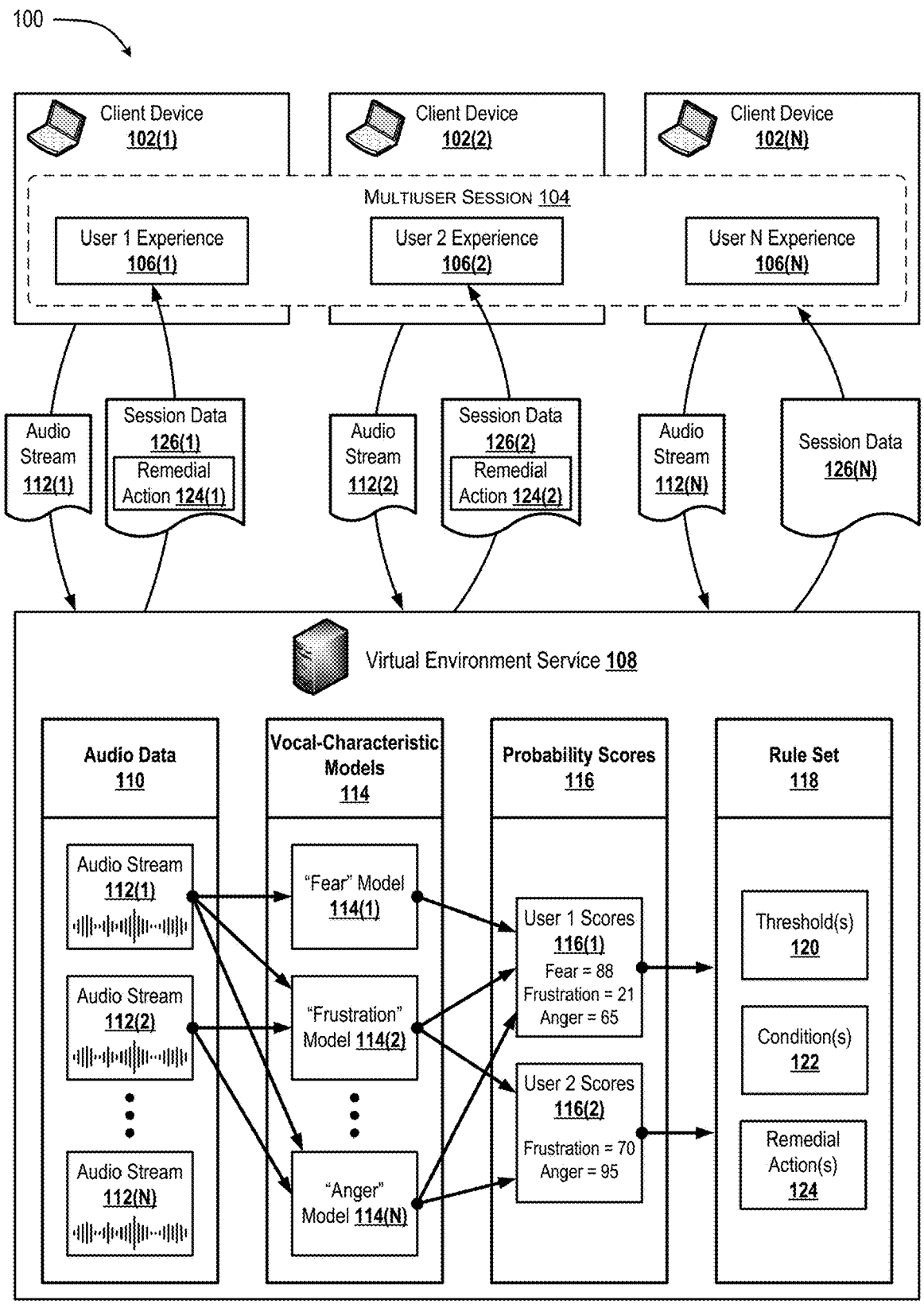
FIG. 1 is a diagram illustrating an example environment in which a virtual environment service, that is facilitating a multiuser session, can dynamically adjust a user experience for individual participants based on outputs from one or more multiple vocal-characteristic models.

The following Detailed Description is directed toward techniques for enabling a system that is actively facilitating a multiuser session to dynamically adjust a user experience for the multiuser session based on vocal-characteristic models. Generally described, the vocal-characteristic models may be used to analyze audio streams that are received during the multiuser session in association with individual participants of the multiuser session. As discussed briefly above, individual ones of the vocal-characteristic models may be designed to identify emotional state indicators corresponding to certain vocal properties that correlate with (and therefore may be considered "tells" for) a participant being in a predefined emotional state. Then, based on the results of the foregoing analysis (and/or other relevant factors some of which are described herein), the system may proactively perform various actions to dynamically adjust how the participants experience the multiuser session. In some examples, the action performed may adjust how the participants as a group experience the multiuser session (e.g., a remedial action may alter aspects of a gaming environment for the entire group of participants). In some examples, the action performed may adjust how one or more individual participants experience the multiuser session (e.g., the remedial action may mute a specific participants audio stream). In this way, the systems and techniques described herein are usable to proactively react to the current emotional state of participants of a multiuser session to improve these participants' overall user experience. Stated alternatively, the disclosed technologies enable real-time moderation of in-session voice chats to reduce the "toxicity" that these participants are exposed to over social channels by reacting to emotions that can be detected within participants' voices.

As described in detail below, individual vocal-characteristic models may receive an individual audio streams for a specific participant as an input and may output a probability score that the specific participant (whose voice can be heard in the analyzed audio stream) is in a predefined emotional state. In some examples, the probability scores associated with the specific participant may be further based on various factors other than the analysis of that participant's voice with respect to the vocal-characteristic models. Then, based on the probability scores that are output from the various vocal-characteristic models and/or other factors, the system may perform various remedial actions in accordance with a rule set. An exemplary rule set may specifically define threshold scores that, when exceeded by the probability scores, trigger certain remedial actions. For example, the rule set may define a threshold score of eighty-five ("85") in association with a specific remedial action and a specific vocal-characteristic model so that when the probability score that is output from this specific vocal-characteristic model exceeds eighty-five ("85"), the system responds by performing the specific remedial action. In some examples, the rule set may further define conditions which must be met for one or more remedial actions to be triggered. For example, in addition to defining the threshold score of eighty-five ("85") in association with the specific remedial action and the specific vocal-characteristic model, the rule set may further prescribe a condition that the probability score that is output from the specific vocal-characteristic model must be greater than any other probability score that is output by any other vocal-characteristic model being used to analyze a corresponding audio stream. Here, if the probability score output by the specific vocal-characteristic model is eighty-eight "88" but some other vocal-characteristic model outputs a probability score of ninety-three "93," then the system may refrain from performing the specific remedial action (e.g., in favor of some other remedial action).

As described in more detail below, the disclosed techniques provide benefits over conventional systems for facilitating multiuser sessions for at least the reason that human interaction with computing devices and/or multiuser sessions is improved by proactively adjusting how individual participants experience multiuser session(s) in response to emotional state indicators that are detected in the individual participants' voices. For instance, a specific participant's unique experience with respect to a multiuser session is markedly improved because the techniques disclosed herein enable a system to identify vocal properties being exhibited by the specific participant which are indicative of this participant being emotionally distressed (e.g., angry, sad, fearful, etc.) and, ultimately, to proactively mitigate the emotional distress by performing one or more suitable remedial actions. For example, in the event that vocal characteristics of the specific participant indicate a fearful state, the system may identify another participant that is behaving belligerently and/or aggressively toward the "fearful" participant and respond by blocking the "aggressive/belligerent" participant's audio stream. As another example, if vocal characteristics of the specific participant indicate a frustrated state, the system may offer the specific participant with assistance or encouragement with respect to some aspect of the multiuser session (e.g., the system may offer the specific participant with a "hint" as to how to overcome some gaming obstacle which the specific user is stuck on and/or has repeatedly failed to overcome).

Furthermore, some examples described herein reduce bandwidth usage over conventional communications techniques because portions of audio streams (e.g., continuously transmitted voice data) that are causing emotional distress (e.g., due to being aggressive, rude, belligerent, threatening, etc.) to specific participants are identified and prevented from being transmitted to client devices associated with those specific participants (or to any of the participants of the multiuser session). In particular, by identifying and preventing transmission of selected "offensive" portions of the audio streams that are causing emotional distress to others, the disclosed techniques reduce bandwidth usage as compared to conventional communications techniques. Various examples, scenarios, and aspects that effectively adjust a user experience in response to outputs from vocal-characteristic models are described below with references to FIGS. 1-6.

FIG. 1 is a diagram illustrating an example environment 100 in which a virtual environment service 108, that is facilitating a multiuser session 104 spanning across multiple client computing devices 102 (referred to herein as "client devices"), can dynamically adjust a user experience 106 for individual participants (e.g., may be referred to herein as "user" and/or "player" depending on context) based on outputs (e.g., probability scores) that result from one or more multiple vocal-characteristic models 114. For illustrative purposes, aspects of the presently disclosed techniques are predominantly described in the context of the multiuser session 104 being a multiplayer gaming session that includes an in-session voice "chat" functionality enabling participants to use their respective client device 102 to transmit and/or receive real-time voice-based communications with other participants (whom they may be playing with or competing against) of the multiplayer gaming session. It will become apparent that various aspects described herein can be implemented in alternate contexts such as, for example, in the context of a virtual meeting that is conducted for business purposes.

The term "real-time" as used in this Detailed Description and the claims that follow is not intended to imply that data is transmitted instantaneously or that operations are performed instantaneously. Rather, when used in the context of receiving data (e.g., audio streams 112) in "real-time," for example, the term "real-time" is used to clarify that the data is collected by client devices 102 (e.g., via a microphone) and transmitted to the virtual environment service 108 over a relatively short period of time (e.g., over a period of seconds or even milliseconds) and on a continuing basis—as opposed to storing the data on the client devices 102 for an extended period of time (e.g., hours) prior to transmitting the data to the virtual environment service 108. As another example, when used in the context of analyzing data (e.g., audio streams) and performing remedial actions in "real-time," the term is used to clarify that both the analysis and remedial actions are performed relatively quickly (e.g., within seconds or even milliseconds) from some triggering event such as, for example, vocal characteristics consistent with some particular emotional state being present within a participant's voice.

The client devices 102(1)-102(N) enable their respective users to participate, individually or as a team, in the multiuser session 104. The multiuser session 104 can be hosted over a network or otherwise facilitated by the virtual environment service 108 (e.g., PLAYSTATION NOW, NINTENDO NETWORK, XBOX LIVE, FACEBOOK, SKYPE FOR BUSINESS, SKYPE, etc.). In some examples, the virtual environment service 108 can provide game content based on various title(s) so that users of the client devices 102(1)-102(N) can participate in the multiuser virtual environment 104. A title can comprise computing resources (e.g., program code, networking functionality, etc.) that is useable to execute the multiuser session 104 across the client devices 102(1)-102(N). In the context of the multiuser session 104 being a multiplayer gaming session, a title can be associated with an action game, a fighting game, a war game, a role-playing game, a strategy game, a racing game, a sports game, a multiplayer game, or the like. In some implementations, the virtual environment service 108 may at least partially host the multiuser session 104. Additionally, or alternatively, the multiuser session 104 can be hosted by one or more of the client devices 102(1)-102(N) without the virtual environment service 108 (e.g., via peer-to-peer network communications). It should be appreciated that although the techniques described herein are predominantly described in the context of a server-based implementation, in which the virtual environment service 108 performs voice analysis and implements remedial actions, peer-to-peer implementations are also contemplated and within the scope of the present disclosure. In peer-to-peer implementations various operations described herein as being performed at the virtual environment service 108 may be performed at the client devices 102.

The client devices 102 can belong to a variety of classes of computing devices such as gaming console-type devices (SONY PLAYSTATION, MICROSOFT XBOX, etc.), desktop computer-type devices, mobile-type devices, special purpose-type devices, embedded-type devices, and/or wearable-type devices, and/or any other suitable computing device whether currently existing or subsequently developed. Thus, a client device 102 can include, but is not limited to, a gaming console, a desktop computer, a laptop computer, a telecommunication device, a virtual reality (VR) device, an augmented reality (AR) device, a network-enabled television, or any other sort of computing device. The client devices may include input/output (I/O) interfaces that enable communications with input/output devices such as peripheral input devices (e.g., a game controller, a keyboard, a mouse, a pen, a voice input device, a touch input device, a gestural input device, and the like) and/or peripheral output devices (e.g., a display, a headset, audio speakers, a haptic output device, and the like).

In facilitating the multiuser session 104, system 100 may generate unique instances of session data 126 so as to provide individual participants with their own unique user experience 106 in association with the multiuser session 104. For example, as illustrated, the virtual environment service 108 is shown to be transmitting first session data 126(1) to the first client device 102(1), second session data 126(2) to the second client device 102(2), and Nth session data 126(N) to the Nth client device 102(N). In some examples, each of the instances of session data 126 may be continuously generated and transmitted to the respective client devices in real-time to continually control each of the user experiences 106. As used herein, the term "user experience" refers to human perceivable computing outputs (e.g., audio being output from one or more speakers, graphics being rendered on one or more displays) that are generated in association with the multiuser session 104. For example, the first session data 126(1) that is being continuously provided to the first client device 102(1) may include audio data that is being continuously captured at the second and Nth client devices and continuously uploaded to the virtual environment service 108. In this way, a first participant who is experiencing the multiuser session 104 via the computing outputs at the first client device 102(1) may be able to hear the voices of the other participants who are using the second and Nth client devices. Thus, within the context of the present disclosure, descriptions of performing remedial actions to adjust a user experience 106 may specifically refer to modifying the session data 126 being transmitted to any particular client device 102 in order to change the computing outputs at that particular client device.

With respect to the specific operational flow shown in FIG. 1, the virtual environment service 108 continuously receives audio streams 112 from individual ones of the client devices 102. For example, each of the client devices 102 may continuously capture audio data (e.g., a user's voice) via a respective microphone and may continuously stream the captured audio data to the virtual environment service 108 via a corresponding audio stream 112. Upon receipt of the audio streams 112, the virtual environment service 108 may continually embed an appropriate subset of the audio streams 112 into each of the instances of session data 126. For example, embedded within the first session data 126(1) may be the audio data that is received via the second audio stream 112(2) and the Nth audio stream 112(N) to enable a participant who is experiencing the multiuser session 104 via the first client device 102(1) to hear the other participants. Similarly, embedded within the second session data 126(2) may be the audio data that is received via the first audio stream 112(1) and the Nth audio stream 112(N). In addition to the embedded audio data that enables the participants to converse with one another, various instances of session data 126 may further include data that prescribes how the client devices 102 are to generate other computing outputs (e.g., sounds and/or graphics) to generate each unique user experience 106. For example, in the immediate context of the multiuser session 104 being an online multiplayer gaming session, the instances of session data 126 being transmitted to each client device 102 may include graphics data that defines how a gaming environment is to be graphically rendered, gaming audio data that defines gaming sounds (e.g., other than the various participants' voices) that are to be played, and so on.

With respect to dynamically adjusting the user experience 106 for individual participants of the multiuser session 104, the virtual environment service 108 is shown to be analyzing audio data with respect to one or more vocal-characteristic models 114 and, ultimately, to implement suitable remedial actions 124 based on the results of the analysis. In some examples, the virtual environment service 108 may analyze individual ones of the audio streams 112 with respect to individual vocal-characteristic models 114. Generally described, the vocal-characteristic models 114 may be used to analyze the audio streams 112 in order to identify emotional state indicators which are identifiable in the form of certain vocal properties being exhibited by the individual participants. Stated alternatively, the vocal-characteristic models 114 may be designed to detect certain vocal properties that, when exhibited in relation to a neutral speech for a particular participant, are consistent with predefined emotional states. In some examples, individual vocal-characteristic models 114 correspond to individual predefined emotional states. For purposes of the present discussion of FIG. 1, the plurality of vocal characteristic models 114 include a first vocal characteristic model 114(1) that is designed to detect vocal properties that are consistent with a person experiencing a first emotional state (e.g., "fear"), a second vocal characteristic model 114(2) that is designed to detect vocal properties that are consistent with a person experiencing a second emotional state (e.g., "frustration"), and an Nth vocal characteristic model 114(N) that is designed to detect vocal properties that are consistent with a person experiencing an Nth emotional state (e.g., "anger").

In some examples, the virtual environment service 108 may continuously input one or more of the audio streams 110 into one or more of the vocal-characteristic models 114 to generate probability scores 116 associated with individual users being in predefined emotional states. Some individual audio streams 112 may be analyzed with respect to an entire set of a plurality of vocal-characteristic models 114. As illustrated, for example, the first audio stream 112(1) is being continuously input into each of the first vocal-characteristic model 114(1) through the Nth vocal-characteristic model 114(N). Additionally, or alternatively, some individual audio streams 112 may be analyzed with respect to only a selected subset of a plurality of vocal-characteristic models 114. As illustrated, for example, the second audio stream 112(2) is being continuously input into each of the first vocal-characteristic model 114(1) and the second vocal-characteristic model 114(2)—but not the Nth vocal-characteristic model 114(N). As described in more detail below, in some examples, a reputation score associated with a particular user may be used to determine whether to analyze that user's audio stream 112 using one or more vocal-characteristic models 114. For example, if a particular user has a reputation score indicating that he has a history of becoming angry during past multiuser sessions, then this reputation score cause the virtual environment service 108 to analyze this user's audio stream in real-time during the multiuser session 104.

By analyzing the individual audio streams 112 using the various vocal-characteristic models 114, the virtual environment service 108 may identify emotional state indicators associated with those predefined emotional states which the individual vocal-characteristic models 114 are designed to detect. For example, presume that in comparison to neutral speech (i.e., how a person speaks under normal non-distressed circumstances) as defined by a neutral speech profile, speech in which a person exhibits the vocal properties of increased pitch, decreased variation, decreased energy, and/or an increased speech rate with more frequent pauses may be indicative of this person currently experiencing the emotion of fear. In this example, the forgoing vocal properties may serve as emotional state indicators that, when exhibited in a person's current speech (e.g., using that person's neutral speech profile as a baseline for revealing the vocal properties), are indicative of that person being relatively more fearful than normal.

In some examples, the virtual environment service 108 is configured to generate (or otherwise obtain) a neutral speech profile in association with individual users. An exemplary neutral speech profile may define vocal properties that are typically exhibited by the individual users under normal circumstances where the user in not emotionally distressed. Then, identification of the emotional state indicators may be performed by identifying how a user's current speech (e.g., that is being received in real-time via a corresponding audio stream) deviates in comparison to the neutral speech profile. For example, by deploying the "Fear" Model 114(1) to analyze an incoming audio stream, the virtual environment service 114 may generate a probability score associated with a user being fearful based on the currently observed vocal properties including an increase in pitch compared to the neutral speech profile, decreased variation compared to the neutral speech profile, decreased energy compared to the neutral speech profile, and/or increased speech rate compared to the neutral speech profile.

Based on the emotional state indicators that are identified using the various vocal-characteristic models 114, the virtual environment service 108 determines probability scores 116 associated with specific participants being in the various predefined emotional states. For example, as illustrated, the first audio stream 112(1) is being input into each of: the first vocal-characteristic model 114(1) which outputs a "fear" probability score of eighty-eight "88"; the second vocal-characteristic model 114(2) which outputs a "frustration" probability score of twenty-one "21"; and the Nth vocal-characteristic model 114(N) which outputs an "anger" probability score of sixty-five "65". In some implementations, the probability scores may be generated in association with a predefined scale (e.g., a scale of 0-100) along which probability scores fall to indicate a level of certainty that the user's whose voice is being analyzed is experiencing the corresponding emotion. For example, the probability score of eighty-eight "88" in the current scenario may indicate a high level of certainty that a user of the first client device 102(1) (i.e., a first user) is fearful. As further illustrated, the second audio stream 112(2) is being input into each of: the second vocal-characteristic model 114(2) which outputs a "frustration" probability score of seventy "70"; and the Nth vocal-characteristic model 114(N) which outputs an "anger" probability score of ninety-five "95". Thus, the analysis of the second audio stream 112(2) reveals a high level of certainty that the user of the second client device 102(2) (i.e., a second user) is both frustrated and angry.

As described above, the probability scores that are determined in association with individual participants may be further based on one or more factors other than the analysis of that participant's voice (e.g., via a corresponding audio stream) using the vocal-characteristic models 114. For example, the probability score of eighty-eight "88" associated with the user of the first client device 102(1) being fearful may be further based on the probability score of ninety-five "95" associated with the user of the second device 102(2) being angry. To illustrate this point, suppose that an analysis of the second audio stream 112(2) reveals that the second user is speaking in an angry tone and is berating and insulting the first user. Since the second user's aggressive behavior toward the first user may tend to increase the likelihood of the first user feeling fearful (or otherwise emotionally distressed), the virtual environment service 108 may further account for the second user's aggressive behavior in determining the first user's probability score with respect to the "fear" emotional state. Thus, it can be appreciated that in some examples, a probability score that is generated for a particular user in association with a particular emotional state may be generated and/or determined based on first emotional state indicators that have been identified by analyzing the particular user's audio stream and also based on second emotional state indicators that have been determined by analyzing another user's audio stream. For example, the virtual environment service may alter (e.g., multiply by a factor of, add points to, subtract points from, etc.) an initial probability score of eighty-five ("85") that was determined based on the analysis of the first user's audio stream using a "fear" vocal-characteristic model 114(1). Other factors which may be identified and considered/weighed in determining the probability scores associated with a specific participant may include, but are not limited to, whether another participant uses predetermined words or phrases (e.g., if the other user uses a swear word, this may increase the likelihood of the specific user feeling sad, disgusted, fearful, etc.), a reputation association with another user whom is talking to the specific participant (e.g., if the other user has a reputation of being aggressive and/or offensive, this may increase the likelihood of the specific user feeling sad, disgusted, fearful, etc.), historical data indicating whether another participant has been rude or aggressive towards the specific participant in the past, or an age of the specific participant.

Then, based on the analysis of the audio streams 112 using the vocal-characteristic models 114, the virtual environment service 108 implements a rule set 118 by selecting one or more remedial actions 124 to perform responsive to thresholds 120 and/or conditions 122 being satisfied. In plain terms, the remedial actions 124 may be designed to alter the individual user experiences 106 (e.g., by modifying a corresponding instance of session data 126(1)) in response to the probability score(s) 116 exceeding the threshold(s) 120 and/or other conditions 122 being met. As a specific example, an exemplary rule for inclusion in the rule set 118 may prescribe a remedial action 124 of "muting" the second audio stream 112(2) in response to the first user's "fear" probability score exceeding eighty-five ("85") while the second user's "anger" probability score exceeds ninety "90". Thus, since each of these two predefined thresholds have been met, the virtual environment service 108 may perform a first remedial action 124(1) with respect to at least the first session data 126(1) in order to prevent the second user's voice from being heard by the first user. Another exemplary rule for inclusion in the rule set 118 may prescribe a remedial action 124 of issuing a warning and/or "cool down" instruction to any user whose "anger" probability score exceeds a threshold score of ninety "90". Thus, since this predefined threshold has been met in the currently illustrated scenario, the virtual environment service 108 may perform of second remedial action 124(2) with respect to the second session data 126(2) to cause the second client device 102(2) to audibly and/or graphically output a warning to the second user. An exemplary such warning may state "Hello User 2, we have detected an angry tone in your audio stream. We have also detected that one or more other players in this multiuser session are currently feeling fearful. Please take a moment to calm yourself. If we continue to detect anger in your voice and fear in another players voice, we will terminate this session for you. Thank you for your cooperation."

In some example, the threshold score may be set on an individual user basis with respect to one or more vocal-characteristic models 114. For example, a threshold score may be set for the first user with respect to the "fear" vocal-characteristic model 114(1) based on one or more aspects of the user profile of the first user and/or one or more user profiles of other users participating in the multiuser session. As a specific example, the system may set a relatively low threshold score of fifty ("50") with respect to a first user and a first vocal-characteristic model 114(1) based on the first user's profile data indicating an age of sixteen ("16") and the user profile data for the other users indicating ages all above thirty ("30") whereas if the first user's profile data were to instead indicate an age of thirty ("30") the threshold score could be set to ninety ("90"). The following example is provided for illustrative purposes only. In other examples, the threshold may be dynamically set based on a variety of other aspects of the user profiles of the participants of a multiuser session. Some aspects include, but are not limited to, an average age of the participants, a minimum age of the participants, a maximum age difference between the oldest participant(s) and youngest participant(s), and/or any other information that is available to the virtual environment service via user profile data. Furthermore, it should be appreciated that in some circumstances, the threshold scores may be determined based on information about the participants that is available via the user profile data but is not shared with other participants of the multiuser session. Additionally, or alternatively, the threshold score may be set on a per multiuser session basis with respect to one or more vocal-characteristic models 114 based on any of the factors described herein.

Turning now to FIG. 2A through FIG. 2D, example scenarios are illustrated in which deploying vocal-characteristic models to analyze real-time audio streams results in various rule set criteria being satisfied for triggering suitable remedial actions. It should be appreciated that various aspects described in relation to one or more of FIG. 2A through 2D may be omitted from the example scenario those aspects are described in relation to and/or combined with other example scenarios. Furthermore, the limited number of example scenarios described herein are for illustrative purposes only and are not to be construed as limiting of the applicable scope of the presently disclosed techniques. Performance of various aspects of the techniques described herein are contemplated under many other factual scenarios.

Figure 2A:
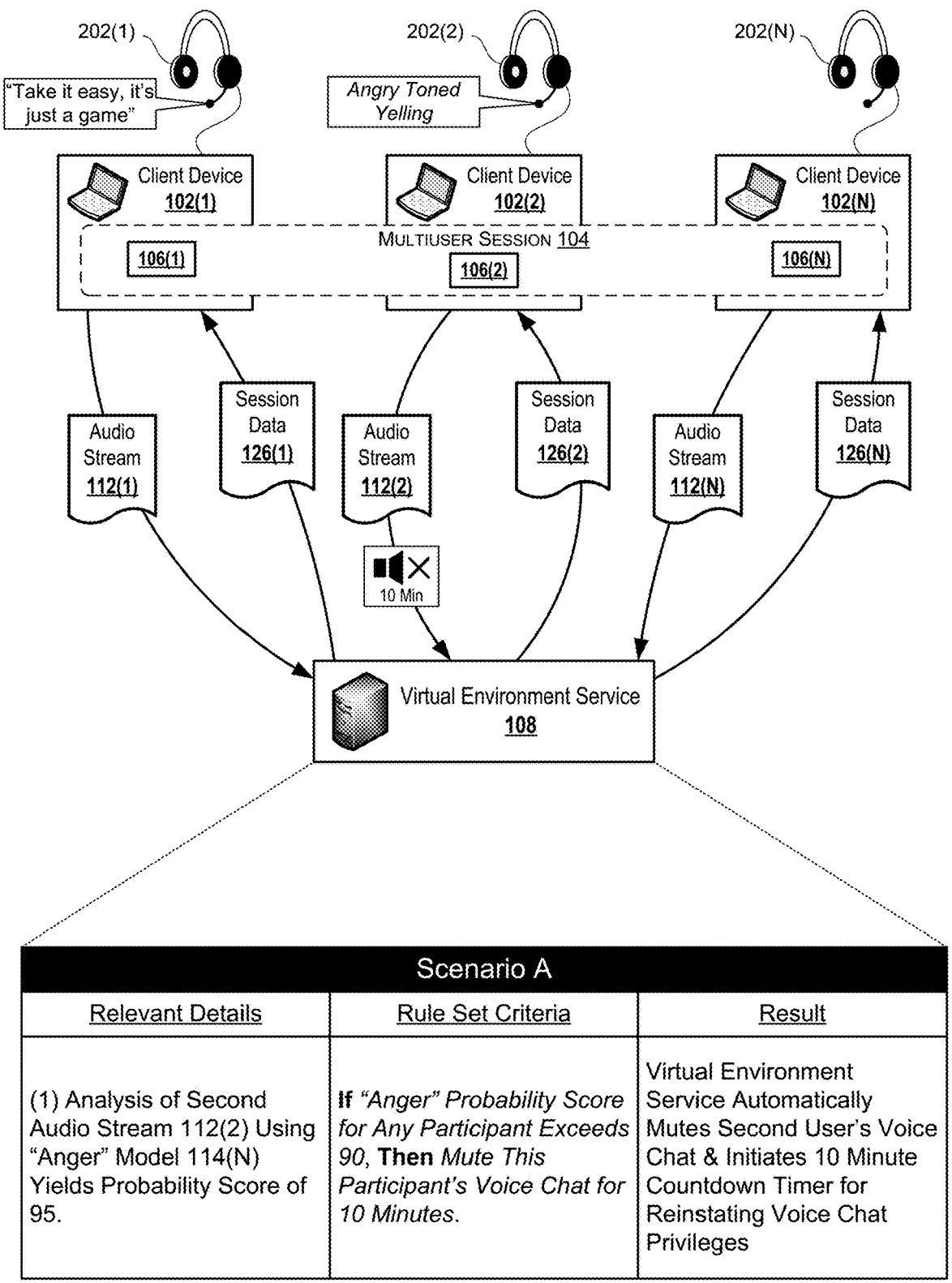
FIG. 2A illustrates a scenario in which rule set criteria prescribes a remedial action of temporarily muting a participant's audio stream responsive to a probability score associated with the participant's audio stream exceeding a threshold score.

FIG. 2A illustrates a scenario in which rule set criteria (e.g., as defined in the rule set 118) prescribes a remedial action of temporarily muting a participant's audio stream responsive to a probability score associated with the participant's audio stream exceeding a threshold score. As illustrated, a plurality of client devices 102 that are being used to participant in a multiuser session 104 are each connected to a headset 202. In the specifically illustrated scenario, the second headset 202(2) is shown to be recording angry toned yelling by the second user whereas the first headset 202(1) is shown to be recording the first user responding calmly by saying "Take it easy, it's just a game."

With respect to the relevant details of scenario A, the virtual environment service 108 analyzes the second audio stream 112(2) in real-time using the Nth vocal-characteristic model 114(N) as described in relation to FIG. 1. For purposes of the present scenario, the Nth vocal-characteristic model 114(N) is designed to identify vocal characteristics that are indicative of a user being angry such as, for example, reduced pitch in comparison to neutral speech, increased intensity in comparison to neutral speech, and so on. Here, the analysis of the second audio stream 112(2) using the "Anger" Model 114(N) yields a probability score of ninety-five "95". Thus, in the present scenario, the pitch, tone, energy, speed, and/or other identifiable vocal characteristics indicate a high probability that the second user is currently angry.

With respect to the specific rule set criteria of scenario A, the rule set 118 prescribes a remedial action of muting any participant's voice chat in the event that an analysis of that participant's audio stream 112 using the "Anger" Model 114(N) yields a probability score greater than ninety "90". Thus, since the analysis of the second audio stream 112(2) using the "Anger" Model 114(N) yielded the probability score of ninety-five "95", this specific rule set criteria has been satisfied and the virtual environment service 108 is shown to perform the prescribed remedial action by muting the second participant's audio stream 112(2) for a period of 10 minutes. In some implementations, the virtual environment service 108 may continue to receive and analyze the second audio stream 112(2) even while it is muted with respect to the multiuser session 104 so that other users cannot hear the second user. In such implementations, the virtual environment service 108 may continue to perform a remedial action with respect to the second audio stream 112(2) until the probability score that result from analyzing the second audio stream 112(2) with the Nth vocal-characteristic model 114(N) falls below a threshold score. As a specific example, responsive to the probability score of ninety-five "95" being initially detected, the virtual environment service 108 may mute the second audio stream 112(2) with respect to the other users and may continually analyze the second audio stream 112(2) during this "muted" time period to ensure that the second user remains muted until the probability score yielded from analyzing his or her audio stream falls below 60.

For purposes of the present discussion, an instance in which a remedial action is performed against a particular user in response to rule set criteria being satisfied and warranting a consequence (e.g., terminating a user's session, muting a user during a current session, etc.) may be referred to as an enforcement event. In some examples, a user profile for any particular user may include a reputation score that is determined based at least in part on a number of previous enforcement events that have been performed with respect to the individual user. For example, if a user's has been previously muted 10 times based on the rule set criteria of scenario A being satisfied, then the user profile data or user account data associated with this user may indicate that she has had 10 previous enforcement events performed against her.

In some examples, rather than muting the participant for a predefined amount of time (e.g., 10 minutes), the rule set criteria may prescribe a remedial action of scrubbing (e.g., selectively muting) only those portions of an audio stream 112 that exhibit certain vocal properties. For example, in an implementation in which the second audio stream 112(2) is being continuously analyzed in real-time throughout the multiuser session 104 using the "Anger" Model 114(N), the "Anger" model 114(N) may output probability scores on an ongoing and continuous basis with respect to sequential portions of the second audio stream 112(2). To illustrate this point, presume that the analysis of the second audio stream 112(2) using the "Anger" model 114(N) outputs a discrete probability score in association with each sequential 10 second portion of the second audio stream 112(2). Further presume that a $1^{st}$ portion is assigned a probability score of 50, a $2^{nd}$ portion is assigned a probability score of fifty-five "55", a $3^{rd}$ portion is assigned a probability score of 60, a $4^{th}$ portion is assigned a probability score of eighty-five ("85"), a $5^{th}$ portion is assigned a probability score of ninety-five "95", and a $6^{th}$ portion is assigned a probability score of eighty-five ("85"). If the rule set criteria is set to cause the virtual environment service 108 to selectively scrub only those portions of the audio stream 112(2) having a probability score of greater than ninety "90", then only the $5^{th}$ portion would be muted under the forgoing circumstances.

Figure 2B:
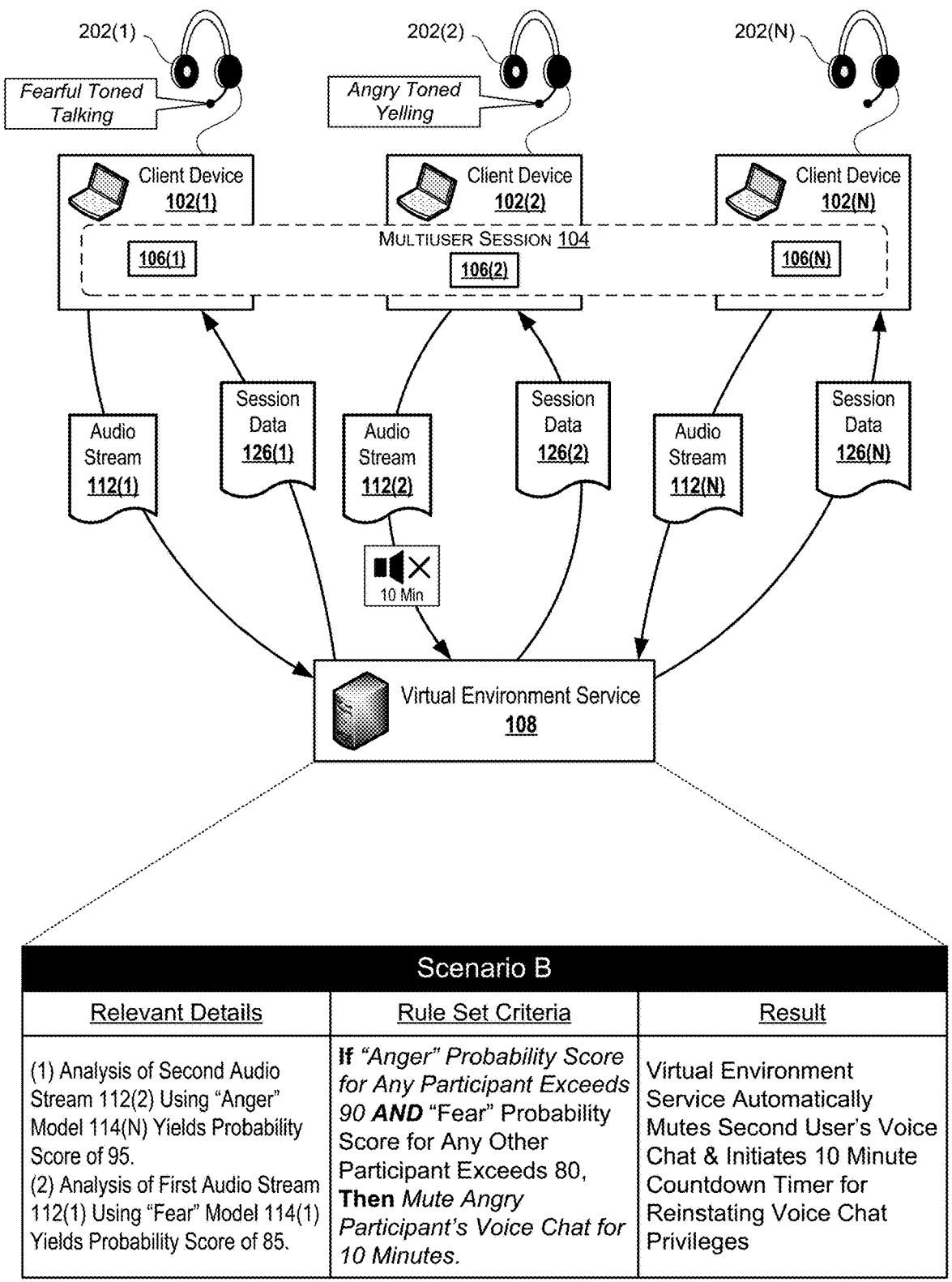
FIG. 2B illustrates a scenario in which rule set criteria prescribes a remedial action that is triggered based on the combined results of analyzing multiple audio streams.

In some examples, the rule set criteria may prescribe a remedial action that is triggered based on the combined results of analyzing multiple audio streams 112. FIG. 2B, in conjunction with FIG. 1, illustrates an example of such an example. In the illustrated example, the rule set criteria prescribe a remedial action of muting a particular participant's audio stream in response to: (1) an "Anger" probability score for that participant exceeding ninety "90"; and (2) a "Fear" probability score for some other participant exceeding eighty "80". With respect to the relevant details of scenario A, the analysis of the second audio stream 112(2) using the "Anger" model 114(N) yields a probability score of ninety-five "95". Furthermore, the analysis of the first audio stream 112(1) using the "Fear" model 114(1) yields a probability score of eighty-five ("85"). Thus, since both of the outlined criteria have been satisfied by analyzing the first audio stream 112(1) and the second audio stream 112(2), this particular rule has been satisfied and the virtual environment service 108 is shown to perform the prescribed remedial action. Here, the prescribed remedial action is muting the second participant's audio stream 112(2) for a period of 10 minutes. However, this remedial action is described for illustrative purposes only, and many other suitable remedial actions for altering one or more user experiences 106 are contemplated and within the scope of the present disclosure.

Figure 2C:
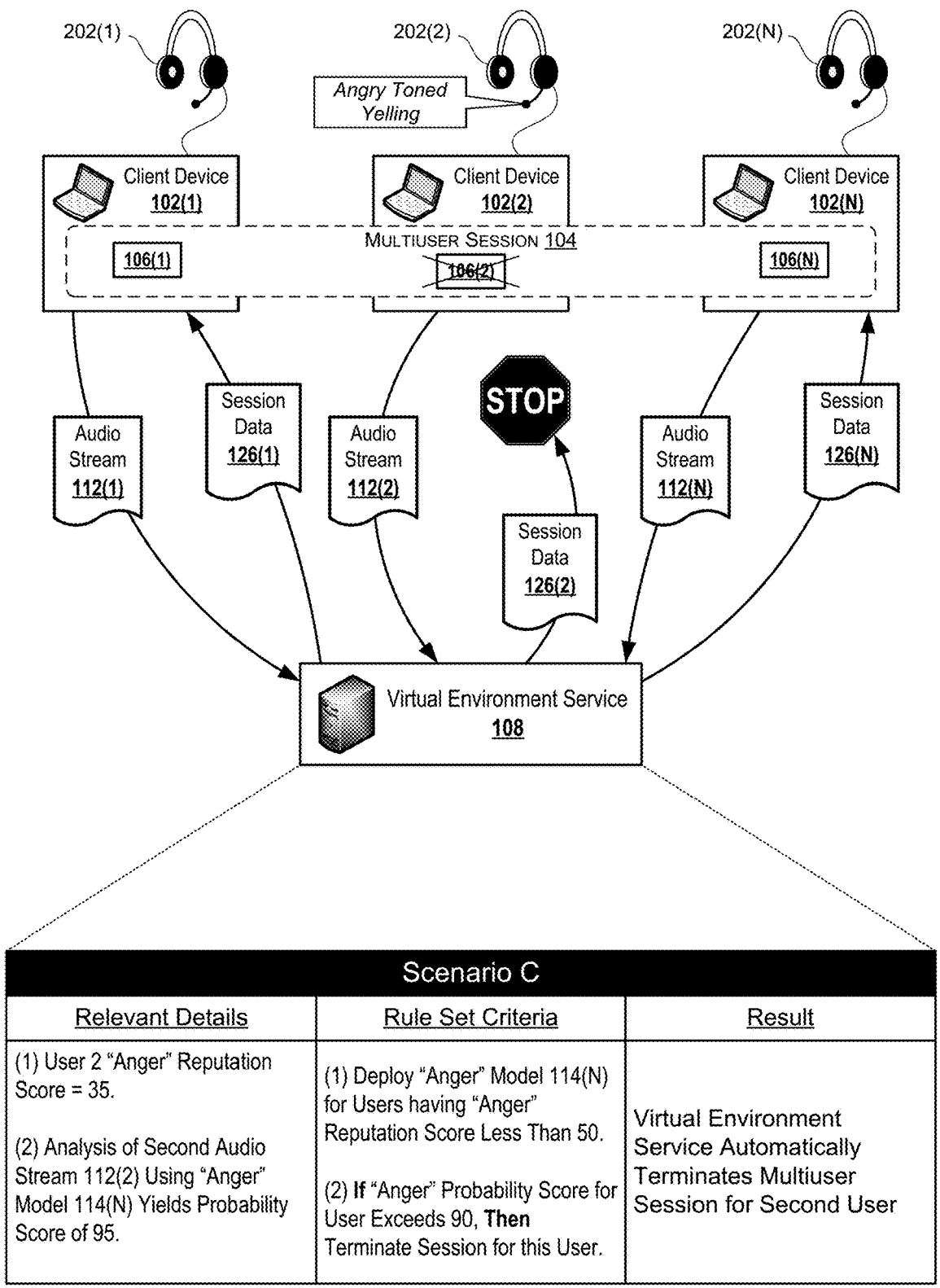
FIG. 2C illustrates a scenario in which rule set criteria prescribes conditions for determining a subset of the audio streams to analyze using one or more vocal-characteristic models.

In some examples, the rule set criteria may prescribe one or more conditions 122 for determining a subset of the audio streams 112 to analyze using one or more vocal-characteristic models 114. FIG. 2C, in conjunction with FIG. 1, illustrates an example of such an example. In the illustrated example, the rule set criteria define a condition for which particular audio streams 112 are to be analyzed using the Nth vocal-characteristic model 114(N). Here, the rule set criteria prescribe that the Nth vocal-characteristic model 114(N) is to be deployed for users that have an associated reputation score that is less than some threshold score (e.g., 50 in the illustrated scenario). Such reputation scores may be stored in historical data about the users, e.g., within a user profile for each individual user. For purposes of scenario C, the Nth vocal-characteristic model 114(N) is the "Anger" model described above and the Reputation Score that is used to determine whether to deploy the "Anger" model against any particular user's audio stream 112 is an "Anger" Reputation Score that indicates a degree to which particular user's have exhibited angry behavior in the past.

In various implementations, the Reputation Score may be stored in user profile data that defines unique participant profiles. The virtual environment service 108 may utilize the user profile data that is received from the individual participants to generate the unique participant profiles corresponding to each individual participant. In addition to reputation scores, a participant profile can include one or more of an identity of a participant (e.g., a unique identifier such as a user name, an actual name, etc.), a skill level of the participant, a rating for the participant, an age of the participant, a friends and/or family list for the participant, a location of the participant, etc. Participant profiles can be used to register participants for multiuser virtual environments such as, for example an individual multiplayer gaming session.

In the specifically illustrated scenario, the rule set criteria prescribe a condition that results in the "Anger" Model 114(N) being used to analyze the audio streams 112 of only those users having a reputation score of less than 50 (e.g., a reputation threshold). In this way, the virtual environment service 108 selectively deploys one or more vocal-characteristic models 114 with respect to a certain subset of users that are of interest for some reason. For example, here the virtual environment service 108 only deploys the "Anger" model 114(N) with respect to users that have a low reputation with respect to "Anger" due to having exhibited a history of angry behavior. Furthermore, the rule set criteria further prescribe a particular remedial action to be performed when the "Anger" probability score that results from analyzing the audio streams of any one of these users exceeds a predefined threshold. Specifically, the rule set criteria prescribes that users having historical data that defines an "Anger" reputation score of less than 50 and whose current or real-time "Anger" probability score exceeds ninety "90" are to have their user experience 106 with respect to the multiuser session 104 terminated.

Here, the relevant details of scenario C include the second user having an "Anger" reputation score of 35—thereby resulting in the virtual environment service 108 analyzing the second audio stream 112(2) during the multi-user session 104. The relevant details of scenario C further include the foregoing analysis of the second audio stream 112(2) using the "Anger" model 114(N) yielding an "Anger" probability score of ninety-five "95". As a result of these relevant details, the rule set criteria prescribes a remedial action of terminating the second user experience 106(2). Stated alternatively, the virtual environment service 108 automatically responds to users whom have exhibited certain poor behavior in the past (e.g., as indicated by the reputation score being below a threshold) again exhibiting this type of poor in a current multiuser session by kicking these users out of the current multiuser session. In this way, the remaining users are able to continue participating in the multiuser session (e.g., by playing an online game) without being continuously exposed to the poor behavior of repeat offenders.

In some examples, the reputation score for any particular user may be determined based on one or more factors associated with that user's account profile. For example, the reputation score for a particular user may be determined based on a number of complaints that have been previously issued against the particular user by other users. Additionally, or alternatively, the reputation score for the particular user may be determined based on a number of other users whom have blocked the particular user. Additionally, or alternatively, the reputation score for the particular user may be determined based on a ratio between the % of people that have blocked the particular user with respect to a number of friends and/or follower the particular user has. Additionally, or alternatively, the reputation score for the particular user may be determined based on a number of previous remedial actions or enforcement events have been performed against the particular user.

Figure 2D:
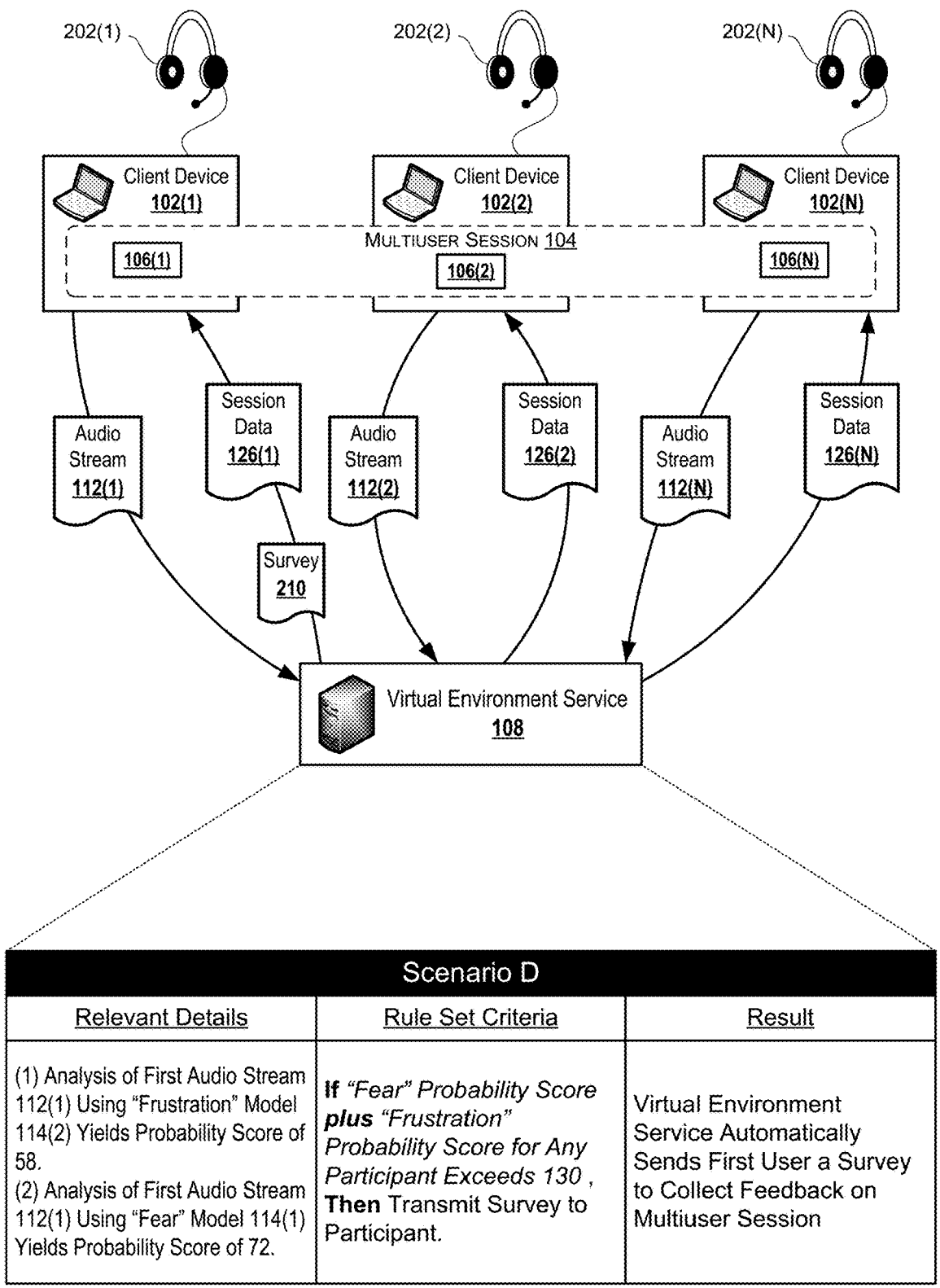
FIG. 2D illustrates a scenario in which rule set criteria prescribes remedial actions to be performed in the event that an aggregated probability score that is based on multiple vocal-characteristic models exceeds a threshold.

In some examples, the rule set criteria may prescribe remedial actions to be performed in the event that an aggregated probability score that is based on multiple vocal-characteristic models 114 exceeds a threshold. FIG. 2D, in conjunction with FIG. 1, illustrates an example of such an example. In the illustrated example, the rule set criteria prescribe that a survey is to be transmitted to a particular participant (e.g., to collect feedback on the multiuser session 104) in the event that a "Fear" probability score plus a "Frustration" probability score exceeds a threshold score of one-hundred-and-thirty "130." As shown in the relevant details section of scenario D, an analysis of the first audio stream 112(1) using the "Frustration" Model 112(2) yields a probability score of fifty-eight "58" and an analysis of the first audio stream 112(1) using the "Fear" Model 112(1) yields a probability score of seventy-two "72". Thus, the aggregated "Fear" and "Frustration" probability score is 131—which exceeds the threshold of 130. As a result, the virtual environment service 108 is caused to automatically send a survey 210 to the first client device 102(1) to collect feedback from the first user.

Figure 3:
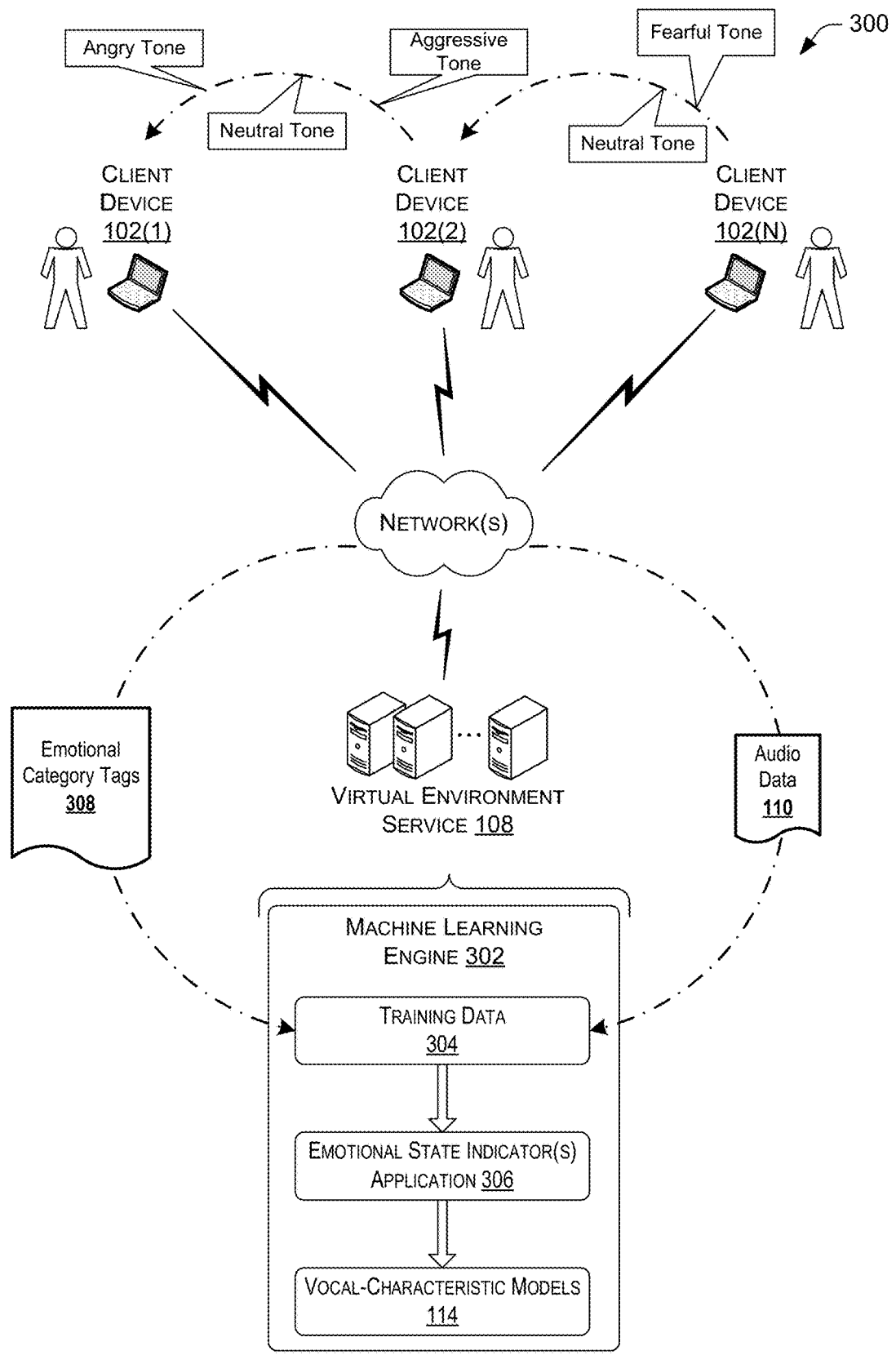
FIG. 3 is a schematic diagram of an illustrative computing environment for deploying a machine learning engine to analyze audio data in association with emotional category tags to generate vocal-characteristic models.

FIG. 3 is a schematic diagram of an illustrative computing environment 300 for deploying a machine learning engine 302 to analyze audio data 110 in association with emotional category tags 308 to generate vocal-characteristic models 114. Ultimately, the generated vocal-characteristic models 114 can be deployed in real-time with respect to multiuser sessions 104 as described above in order to dynamically adjust a user experience 106 in response to one or more users exhibiting certain vocal properties.

In some examples, the vocal-characteristic models 114 may be created by employing supervised learning wherein one or more humans assists in generating training data 304 by labeling the audio data 110 using the emotional category tags 308. As illustrated, for example, the machine learning engine 302 receives training data 304 in the form of audio data 110 that has been manually reviewed and, based thereon, tagged with emotional category tags 308. The audio data 110 may include a plurality of recorded voice conversations such as, for example, a plurality of recorded audio streams 112 that have been recorded during past multiuser sessions 104. The emotional category tags 308 may each correspond to a particular predefined emotional state such as, for example, anger, sadness, apprehension, or disgust. In such an example, the training data 304 may include voice conversations that have been tagged in terms of sentiment and have also been categorized in terms of predefined emotions that are exhibited. For example, a suitable sample of recorded conversations (e.g., 30 hours or more) may be individually tagged as having a sentiment value of positive, neutral, or negative. Additionally, or alternatively, the sample of recorded conversations may be categorized as being representative of specific emotional states (e.g., using the emotional category tags). In this way, the machine learning algorithm may "learn" to identify certain vocal properties that are consistently exhibited across groups of sample conversations that are categorized as being representative of specific emotional states and, therefore, serve as emotional state indicators for the specific emotional states. These vocal properties may be measured in relation to a base line of neutral speech for any particular users voice.

Additionally, or alternatively, other machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on.

In the illustrated example, the machine learning engine 302 includes an emotional state indicators application 306 for analyzing the training data 304 to identify emotional state indicators associated with the various predefined emotional states. Stated in plain terms, the machine learning engine 302 may utilize a suitable machine learning algorithm to identify (e.g., "learn") certain vocal properties that are consistently exhibited across different samples of the audio data 110 that are similarly tagged with certain emotional category tags 308. In this way, the machine learning engine 302 may learn which vocal properties to monitor for variations in (e.g., with relation to neutral speech profiles for individual users) due to such variations being indicative of a user being in an emotional state of interest. Exemplary emotional state indicators that may be identified by the emotional state indicators application 306 in relation to particular predefined emotional states as indicated by the emotional category tags 308 include, but are not limited to:

Anger: In some instances, an emotional state of anger may be probable for a particular user when that user's speech fluctuates from neutral speech with a noticeable decrease in pitch, increase in intensity, increase in energy level across a vocalization, to name a few. Accordingly, based on the training data 304, the emotional state indicators application 306 may identify these vocal properties as being emotional state indicators for a predefined emotional state of "anger."

Disgust: In some instances, an emotional state of disgust may be probable for a particular user when that user's speech fluctuates from neutral speech with a noticeably lower and downward directed pitch, and a lower first formant, to name a few. Accordingly, based on the training data 304, the emotional state indicators application 306 may identify these vocal properties as being emotional state indicators for a predefined emotional state of "disgust."

Fear: In some instances, an emotional state of disgust may be probable for a particular user when that user's speech fluctuates from neutral speech with a noticeable increase in pitch, reduction in variation and/or energy, and increased speech rate and pause frequency. Accordingly, based on the training data 304, the emotional state indicators application 306 may identify these vocal properties as being emotional state indicators for a predefined emotional state of "fear."

Of course, other types of predefined emotional states may also be of interest for identifying and performing remedial actions and are within the scope of the present disclosure. Also, other types of vocal properties may be identified as "indicators" of any particular emotional state based on the training data 304.

Based on the "emotional state indicators" that are identified by the emotional state indicators application 306, the machine learning engine 302 may build vocal-characteristic models 114 and may also update and/or revise the vocal-characteristic models 114 as the training data 304 evolves over time. As various emotional state indicators may exhibit stronger correlations with a certain emotional state than other emotional state indicators, the machine learning engine 302 may determine weights (e.g., weighting factors) that apportion an influence of each of the emotional state indicators with respect to other emotional state indicators. For example, identifying a first vocal property such as increased pitch may correlate strongly with fear whereas a second vocal property such as increased pause frequency may also correlate with fear but less strongly than the first vocal property. In this example, the first vocal property may be assigned a relatively higher weight than the second vocal property within a vocal-characteristic model 114 that is designed to detect the presence of fear in user's voices.

Once generated, the vocal-characteristic models 114 may be used to analyze audio streams 112 in real-time (e.g., as they are received in association with a multiuser session 104) to generate probability scores that indicate a likelihood that any particular participant is exhibiting certain emotional behavior for which some remedial action may be suitable. For example, as described above in relation to FIG. 2A, an "Anger" model 114 may be deployed to identify when a user exhibits vocal properties that are correlated with angry speech. Furthermore, depending on how strongly the currently exhibited vocal properties correlate with those properties defined in the "Anger" model 114, a probability score may be generated in relation to a predefined scale. For example, the probability scores may be generated in association with a scale of 0-100 along which probability scores may fall to indicate a level of certainty that the user's whose voice is being analyzed is experiencing the corresponding emotion.

In some examples, the vocal-characteristic models 114 that are usable to generate the probability scores in association with individual users being in predefined emotional states are natural-language agnostic in the sense that an individual vocal-characteristic model may be used to analyze voice-based speech and generate an associated probability score regardless of the natural-language the voice-based speech is in. For example, the "Anger" Model 114(N) described above may be used to analyze voice-based speech of a particular user that is speaking in the English language and generate a probability score associated with a likelihood of this particular user being currently angry (e.g., based on detected variations in vocal properties as compared to neutral speech). Similarly, this same "Anger" Model 114(N) above may be used to analyze voice-based speech of another user that is speaking in the Spanish language and generate another probability score associated with a likelihood of this other user being currently angry (e.g., based on detected variations in vocal properties as compared to neutral speech).

Figure 4:
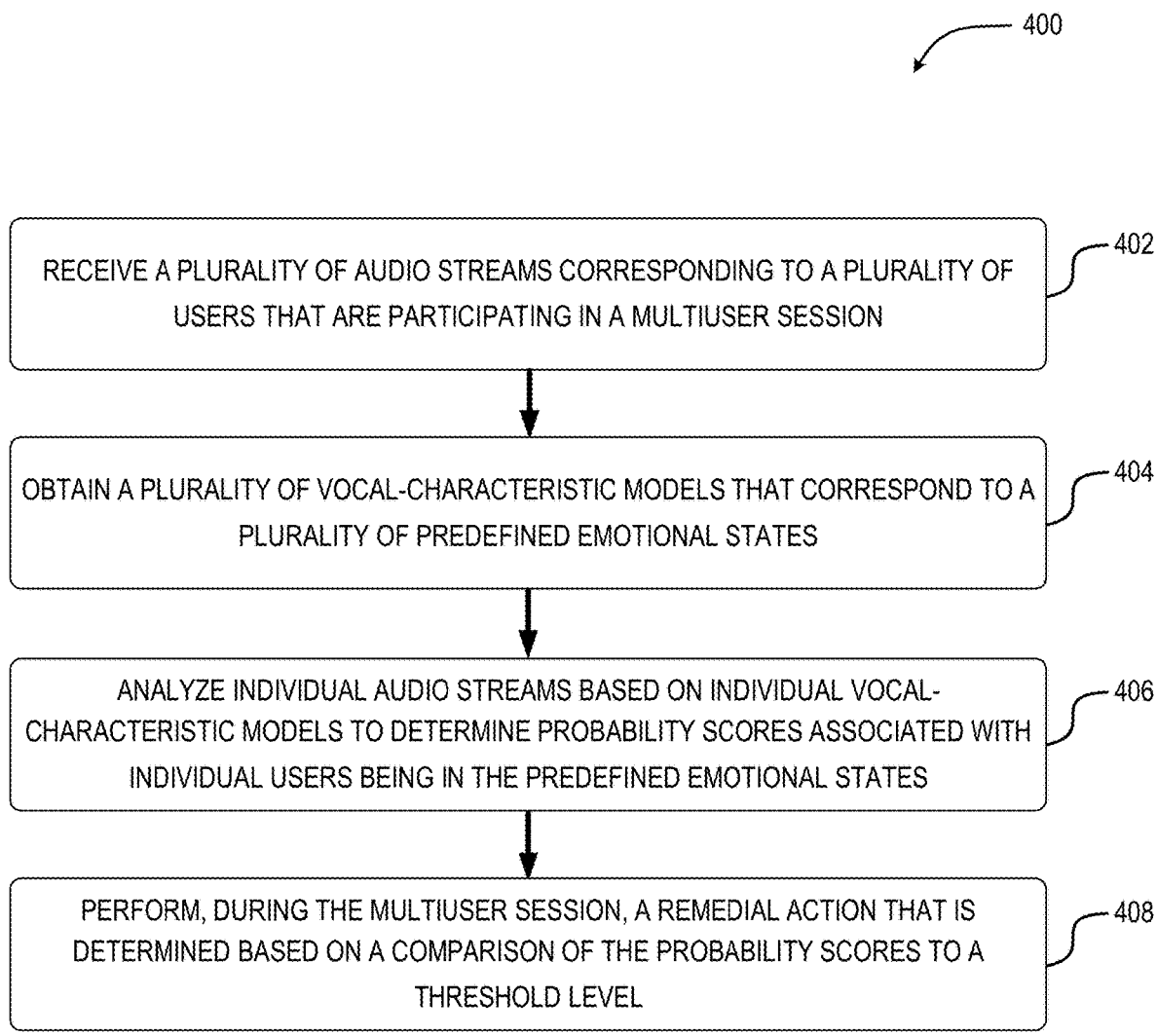
FIG. 4 is a flow diagram of an example method for performing remedial actions to alter a user experience associated with a multiuser session in response to probability scores generated in association with individual users experiencing predetermined emotional states exceeding threshold scores.
Figure 5:
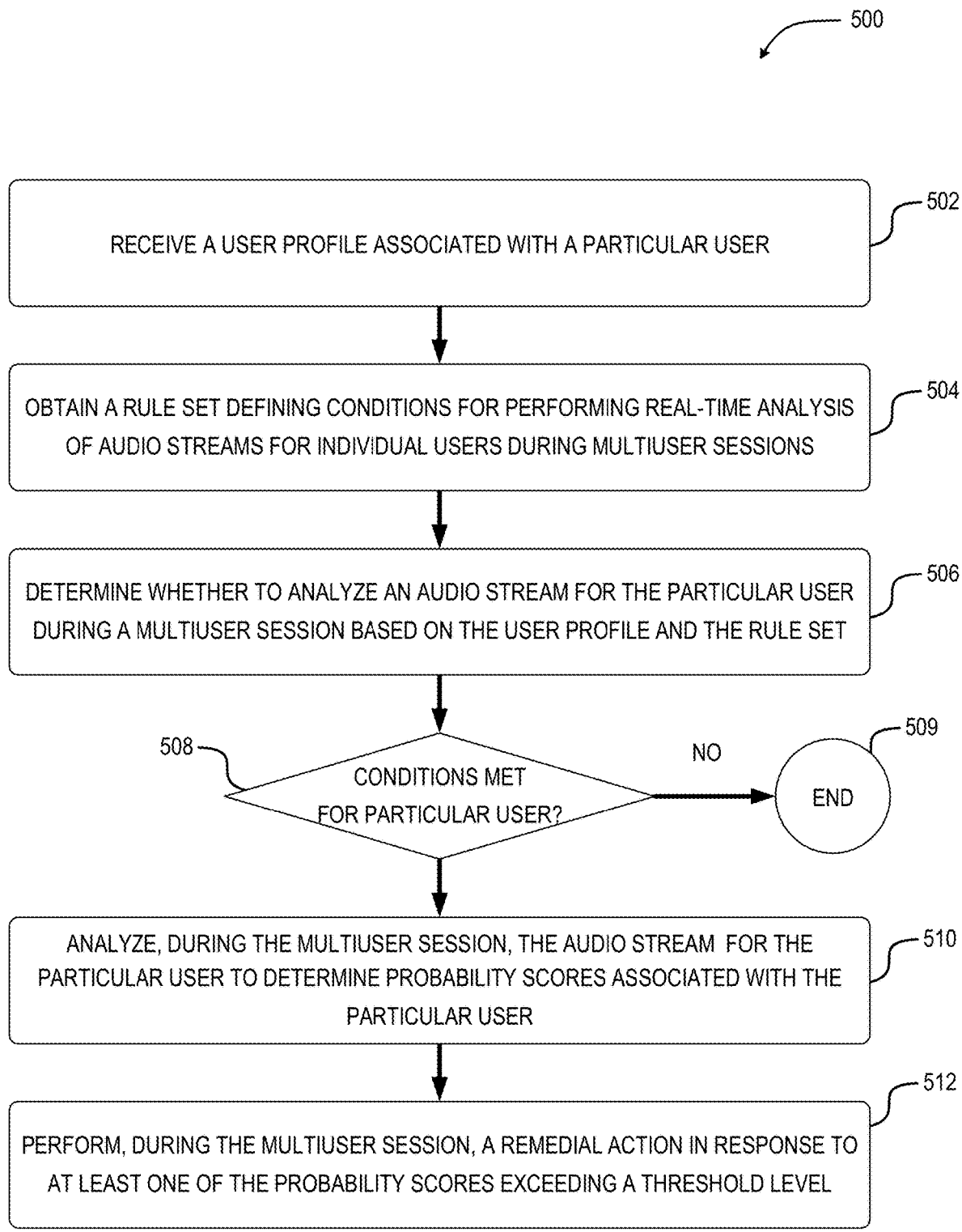
FIG. 5 is a flow diagram of an example method for selectively analyzing audio streams for particular users based on conditions being met in association with the user profile for the particular users.

FIGS. 4 and 5 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like. Computer-executable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., server resources allocated to the virtual environment service 108, and/or client device(s) 102) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

FIG. 4 is a flow diagram of an example method 400 for performing remedial actions to alter a user experience associated with a multiuser session in response to probability scores generated in association with individual users experiencing predetermined emotional states exceeding threshold levels. Exemplary multiuser sessions include, but are not limited to, a multiplayer gaming session (e.g., in which remotely located participants can virtually compete with one another while communicating via an in-session voice "chat") and virtual meetings (e.g., in which participants can communicate via voice-based communications and/or see video of each other in real-time).

At block 402, a system receives a plurality of audio streams that correspond to users (e.g., participants) that are participating in a multiuser session 104. For example, as described in relation to FIGS. 1-2D, the users may each be using respective client devices to participate in the multiuser session. Furthermore, each of the client devices may include an input device for recording a user's voice as audio data. Then, this audio data may be uploaded to a virtual environment service.

At block 404, the system receives a plurality of vocal-characteristic models that correspond to a plurality of predefined emotional states. As described above, individual ones of the plurality of vocal-characteristic models may be generated using machine learning techniques. Furthermore, individual ones of the plurality of vocal-characteristic models may be designed to analyze the individual audio streams to detect vocal properties that are consistent with (or otherwise indicative of) individual users being in individual ones of the predefined emotional states.

At block 406, the system analyzes the individual audio streams based on individual vocal-characteristic models to determine probability scores associated with individual users being in the predefined emotional states. For example, if an analysis of an individual audio stream using an individual vocal-characteristic model reveals a high correlation between the speech that is recorded in the audio stream and vocal properties that are typically exhibited when a user is fearful, then the analysis may output a probability score indicating a high likelihood of the recorded user being in a fearful state of emotional distress.

At block 408, the system performs a remedial action that is determined based on comparing at least some of the probability scores to a threshold level. For example, suppose that the rule set criteria being implemented prescribes a remedial action of muting any user's audio stream in the event that an analysis of this user's audio stream using a particular vocal-characteristics model outputs a probability score of eighty "80" or higher. Here, in the event that the probability score that is output by the particular vocal-characteristics model with respect to a particular user's audio stream reaches 83, this user's audio stream will be automatically muted.

FIG. 5 is a flow diagram of an example method 500 for selectively analyzing audio streams for particular users based on conditions being met in association with the user profile for the particular users. FIG. 5 (which includes only blocks 502 through 510) can be implemented in association with individual operations and FIG. 4 and/or any other operation described herein whether or not described in relation to a flowchart.

At block 502, a system receives a user profile associated with a particular user. The user profile can include one or more of an identity of the particular user (e.g., a unique identifier such as a user name, an actual name, etc.), a skill level of the particular user, a rating for the particular user, an age of the particular user, a friends and/or family list for the particular user, a location of the particular user, and one or more reputation scores for the particular user, etc. in some example, the reputation scores may be associated with predefined emotional states and may generated based on historical data indicating how frequently or how many times the particular user has exhibited these predefined emotional states in past multiuser sessions. Participant profiles can be used to register participants for multiuser sessions such as, for example an individual multiplayer gaming session.

At block 504, the system receives a rule set defining conditions for performing real-time analysis of audio streams for individual users during multiuser sessions. For example, the rule set may prescribe a condition that any user having a reputation score of less than 50 in association with a particular emotional state is to have their audio stream analyzed using a vocal-characteristic model designed to detect this particular emotional state. As another example, the rule set may prescribe a condition that any user that is under or over a particular age is to have their audio stream analyzed using one or more vocal-characteristic models during multiuser sessions.

At block 506, the system determines whether to analyze the particular user's audio stream during a multiuser session. For example, the system may determine that the particular user has a low reputation score of 30 with respect to the aforementioned emotional state. Thus, based on the example rule set described in the foregoing paragraph, the system may determine that the user's audio stream is to be continually analyzed in real-time throughout the multiuser session.

From decision block 508, if it is determined at block 506 that the conditions for analyzing the user's audio stream are not met, then the method 500 terminates at end block 509. In contrast, if it is determined at block 506 that the conditions for analyzing the user's audio stream are met, then the method 500 continues to block 510.

At block 510, the system analyses the audio stream for the particular user during the multiuser session. Based on analysis, the system determines probability scores associated with the particular user as described above in relation to FIGS. 1-4.

At block 512, the system performs a remedial action in response to at least one of the probability scores determined at block 510 exceeding a threshold level. For example, in the event that the analysis at block 510 indicates a high probability that the particular user is exhibiting highly angry and belligerent behavior, the system may temporarily mute the particular user.

Figure 6:
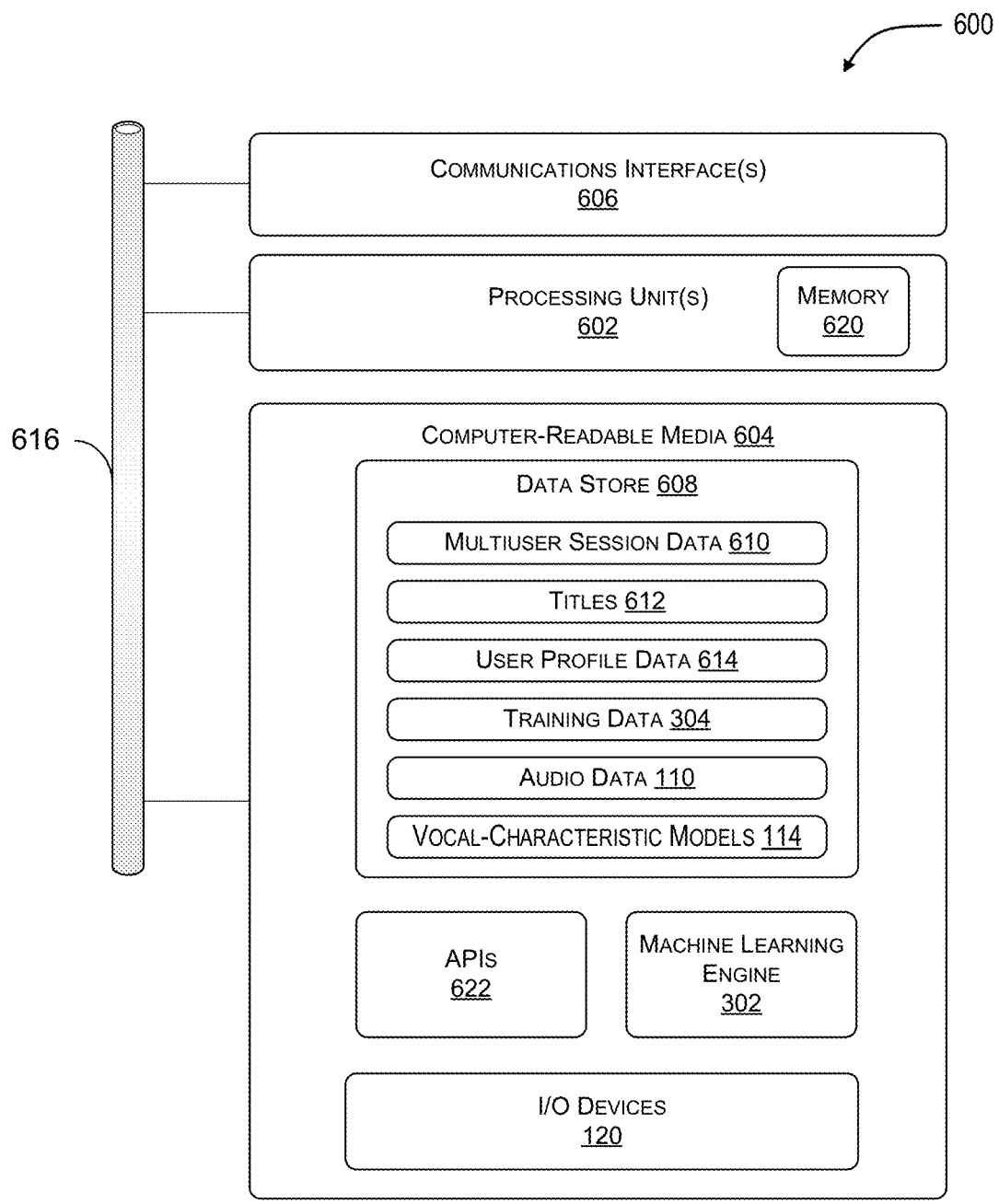
FIG. 6 is a diagram illustrating components of an example device configured to implement various techniques disclosed herein.

FIG. 6 is a diagram illustrating components of an example device 600 configured to implement various techniques disclosed herein. The example device 600 can be a client computing device (e.g., 102(1)) and/or a computing resource associated with (e.g., operated by and/or allocated to) the virtual environment service 108. In some instances, the components illustrated in FIG. 6 can be spread across various ones of the devices described herein.

Device 600 includes one or more processing unit(s) 602, computer-readable media 604, communication interface(s) 606. The components of device 600 can be operatively connected, for example, via a bus 616, which can include one or more of a system bus, a data bus, an address bus, a PCI bus, a Mini-PCI bus, and any variety of local, peripheral, and/or independent buses.

As used herein, processing unit(s), such as processing unit(s) 602 and/or processing unit(s) of other devices used in implementing the techniques described herein, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, computer-readable media, such as computer-readable media 604 and/or computer-readable media of other devices, can store instructions executable by the processing unit(s). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 606 can represent, for example, network interface controllers (NICs) or other types of transceiver devices to send and receive communications over a network.

In the illustrated example, computer-readable media 604 can include a data store 608. In some examples, a data store includes data storage such as a database, data warehouse, or other type of structured or unstructured data storage. In some examples, a data store includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

Data store 608 can store data for the operations of processes, applications, components, and/or modules stored in computer-readable media 604 and/or executed by processing unit(s) 602 and/or accelerator(s). For instance, in some examples, data store 608 can store multiuser session data 610. The multiuser session data 610 can comprise a total number of participants in the multiuser session 104, a mode or category of a title 612 association with the multiuser session 104, activity that occurs in the multiuser session 104 (e.g., behavior, maneuvers, earned points or a score, and/or achievements of the participants), and/or other data related to when and how the multiuser session 104 is executed or hosted. In various examples, the data store 608 can also store data associated with the titles 612, user profile data 614 as described elsewhere herein, training data 304, audio data 110, and/or the vocal-characteristic models 114.

As an alternative, some or all of the above-referenced data can be stored on separate memories 620 on board one or more processing unit(s) 602 such as a memory on board a CPU-type processor, a GPU-type processor, an FPGA-type accelerator, a DSP-type accelerator, and/or another accelerator.

In the illustrated example of FIG. 6, computer-readable media 604 also includes application programming interface(s) (APIs) 622. At least one API is configured to expose the various datatypes and/or modules described herein to, for example, the virtual environment service 108 and/or the client devices 102 (e.g., a desktop computer and/or a gaming console) executing the multiuser virtual environment 104 (e.g., a multiplayer gaming session) and/or program code of the titles 612.

The number of illustrated modules is just an example, and the number can vary higher or lower. That is, functionality described herein in association with the illustrated modules can be performed by a fewer number of modules or a larger number of modules on one device or spread across multiple devices.

EXAMPLE CLAUSES

The disclosure presented herein may be considered in view of the following clauses.

Example Clause A, a system comprising: one or more processing units; and a computer-readable medium having encoded thereon computer-executable instructions to configure the one or more processing units to: receive audio data that is generated in association with a multiuser session, wherein the audio data includes at least a first audio stream that corresponds to a first user and a second audio stream that corresponds to a second user; analyze, during the multiuser session, the first audio stream to identify emotional state indicators that correspond to one or more vocal properties being exhibited by the first user; generate, based on the emotional state indicators, a probability score that is associated with the first user being in a predetermined emotional state; and responsive to the probability score exceeding a threshold score, perform a predetermined remedial action with respect to the second user during the multiuser session.

Example Clause B, the system of Example Clause A, wherein the emotional state indicators are first emotional state indicators and the computer-executable instructions further configure the one or more processing units to analyze, during the multiuser session, the second audio stream to identify second emotional state indicators that correspond to one or more other vocal properties being exhibited by the second user, and wherein generating the probability score associated with the first user being in the predetermined emotional state is further based on the second emotional state indicators.

Example Clause C, the system of any one of Example Clauses A through B, wherein the computer-executable instructions further configure the one or more processing units to analyze, during the multiuser session, the second audio stream to determine that the second user has used a predetermined word or phrase during the multiuser session, and wherein generating the probability score associated with the first user being in the predetermined emotional state is further based on the second user having used the predetermined word or phrase during the multiuser session.

Example Clause D, the system of any one of Example Clauses A through C, wherein the computer-executable instructions further configure the one or more processing units to determine a reputation score for the second user based on historical data associated with the second user, wherein performing the predetermined remedial action with respect to the second user is responsive to the probability score exceeding the threshold score is further based on the reputation score.

Example Clause E, the system of Example Clause D, wherein the reputation score for the second user is determined based on at least one of: a number of complaints associated with the second user, a number of other users that have blocked the second user, or a number of previous enforcement events that been performed with respect to the second user.

Example Clause F, the system of any one of Example Clauses A through E, wherein the predetermined remedial action, that is performed responsive to the probability score associated with the first user being in the predetermined emotional state exceeding the threshold score, includes preventing the second audio stream from being played at a client device of the first user.

Example Clause G, the system of any one of Example Clauses A through F, wherein generating the probability score that is associated with the first user being in the predetermined emotional state includes analyzing the emotional state indicators in relation to a plurality of vocal-characteristic models that correspond to a plurality of emotional states.

Example Clause H, a system comprising: one or more processing units; and a computer-readable medium having encoded thereon computer-executable instructions to configure the one or more processing units to: receive audio data that includes a plurality of audio streams corresponding to a plurality of users that are participating in a multiuser session; obtain a plurality of vocal-characteristic models that correspond to a plurality of predefined emotional states; analyze, during the multiuser session, an individual audio stream based on individual vocal-characteristic models of the plurality of vocal-characteristic models to determine a plurality of probability scores associated with an individual user being in one or more predefined emotional states; and perform, during the multiuser session, a remedial action that is determined based on a comparison of at least one probability score to a threshold score.

Example Clause I, the system of Example Clause H, wherein the plurality of probability scores include: a first probability score associated with the individual user being in a first predefined emotional state, and a second probability score associated with the individual user being in a second predefined emotional state.

Example Clause J, the system of any one of Example Clauses H through I, wherein performing the remedial action is based on the first probability score combined with the second probability score exceeding the threshold score.

Example Clause K, the system of any one of Example Clauses H through J, wherein the computer-executable instructions further configure the one or more processing units to determine a reputation score for the individual user based on historical data associated with the individual user, wherein analyzing the individual audio stream based on at least some of the individual vocal-characteristic models is based on the reputation score.

Example Clause L, the system of any one of Example Clauses H through K, wherein the threshold score is determined based on at least one of: an average age of the plurality of users, a minimum age of the plurality of users, a maximum age difference between an oldest participant a youngest participant, or user profile data associated with one or more of the plurality of users.

Example Clause M, the system of any one of Example Clauses H through L, wherein the computer-executable instructions further configure the one or more processing units to: obtain a neutral speech profile that corresponds to the individual user; and identify deviations from the neutral speech profile within the individual audio stream.

Example Clause N, the system of any one of Example Clauses H through M, wherein at least some of the individual vocal-characteristic models are natural-language agnostic.

Example Clause O, the system of any one of Example Clauses H through N, wherein the individual vocal-characteristic models, of the plurality of vocal-characteristic models, correspond to individual predefined emotional states of the plurality of predefined emotional states.

Example Clause P, a computer-implemented method, comprising: receiving audio data that includes a plurality of audio streams corresponding to a plurality of users that are participating in a multiuser session; obtaining a user profile associated with a particular user of the plurality of users that are participating in a multiuser session; obtaining a rule set that defines one or more conditions for analyzing individual audio streams based on a vocal-characteristic model during the multiuser session; analyzing, during the multiuser session, a particular audio stream associated with the particular user based on a vocal-characteristic model, in response to the user profile associated with the particular user satisfying the one or more conditions; and performing a remedial action in response to a probability score resulting from analyzing the particular audio stream based on a vocal-characteristic model exceeding a threshold score.

Example Clause Q, the computer-implemented method of Example Clause P, further comprising: determining that the user profile associated with the particular user satisfies the one or more conditions based on a reputation score that is defined within the user profile.

Example Clause R, the computer-implemented method of any one of Example Clauses P through Q, wherein the reputation score for the particular user is determined based on at least one of: a number of complaints defined within the user profile, a number of users that have blocked the particular user, or a number of previous enforcement events defined within the user profile.

Example Clause S, the computer-implemented method of any one of Example Clauses P through R, wherein the remedial action includes at least one of: muting the audio stream of the particular user with respect to one or more other users of multiuser session, or terminating a user experience of the particular user for the multiuser session.

Example Clause T, the computer-implemented method of any one of Example Clauses P through S, further comprising: obtaining a neutral speech profile that corresponds to the particular user; and generating the probability score based at least in part on deviations from the neutral speech profile within the particular audio stream.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A system comprising:
one or more processing units; and
a non-transitory computer-readable medium having encoded thereon computer-executable instructions to configure the one or more processing units to:
receive audio data that is generated in association with a multiuser session, wherein the audio data includes at least a first audio stream that corresponds to a first user and a second audio stream that corresponds to a second user;
analyze, during the multiuser session, the first audio stream to identify emotional state indicators that correspond to one or more vocal properties being exhibited by the first user;
generate, based on the emotional state indicators, a probability score that is associated with the first user being in a predetermined emotional state;
responsive to the probability score exceeding a threshold score, perform a predetermined remedial action with respect to the second user during the multiuser session; and determine a reputation score for the second user based on historical data associated with the second user, wherein performing the predetermined remedial action with respect to the second user responsive to the probability score exceeding the threshold score is further based on the reputation score.

2. The system of claim 1, wherein the emotional state indicators are first emotional state indicators and the computer-executable instructions further configures the one or more processing units to analyze, during the multiuser session, a second audio stream to identify second emotional state indicators that correspond to one or more other vocal properties being exhibited by the second user, and wherein generating the probability score associated with the first user being in the predetermined emotional state is further based on the second emotional state indicators.

3. The system of claim 1, wherein the computer-executable instructions further configure the one or more processing units to analyze, during the multiuser session, a second audio stream to determine that the second user has used a predetermined word or phrase during the multiuser session, and wherein generating the probability score associated with the first user being in the predetermined emotional state is further based on the second user having used the predetermined word or phrase during the multiuser session.

4. The system of claim 1, wherein the reputation score for the second user is determined based on at least one of: a number of complaints associated with the second user, a number of other users that have blocked the second user, or a number of previous enforcement events that been performed with respect to the second user.

5. The system of claim 1, wherein the predetermined remedial action, that is performed responsive to the probability score associated with the first user being in the predetermined emotional state exceeding the threshold score, includes preventing the second audio stream from being played at a client device of the first user.

6. The system of claim 1, wherein generating the probability score that is associated with the first user being in the predetermined emotional state includes analyzing the emotional state indicators in relation to a plurality of vocal-characteristic models that correspond to a plurality of emotional states.

7. A system comprising:
one or more processing units; and
a non-transitory computer-readable medium having encoded thereon computer-executable instructions to configure the one or more processing units to:
receive audio data that includes a plurality of audio streams corresponding to a plurality of users that are participating in a multiuser session;
obtain a plurality of vocal-characteristic models that correspond to a plurality of predefined emotional states;
analyze, during the multiuser session, an individual audio stream based on individual vocal-characteristic models of the plurality of vocal-characteristic models to determine a plurality of probability scores associated with an individual user being in one or more predefined emotional states; and
perform, during the multiuser session, a remedial action that is determined based on a comparison of at least one probability score to a threshold score.

8. The system of claim 7, wherein the plurality of probability scores include:
a first probability score associated with the individual user being in a first predefined emotional state, and a second probability score associated with the individual user being in a second predefined emotional state.

9. The system of claim 8, wherein performing the remedial action is based on the first probability score combined with the second probability score exceeding the threshold score.

10. The system of claim 7, wherein the computer-executable instructions further configure the one or more processing units to determine a reputation score for the individual user based on historical data associated with the individual user, wherein analyzing the individual audio stream based on at least some of the individual vocal-characteristic models is based on the reputation score.

11. The system of claim 10, wherein the threshold score is determined based on at least one of: an average age of the plurality of users, a minimum age of the plurality of users, a maximum age difference between an oldest participant a youngest participant, or user profile data associated with one or more of the plurality of users.

12. The system of claim 7, wherein the computer-executable instructions further configure the one or more processing units to:
obtain a neutral speech profile that corresponds to the individual user; and
identify deviations from the neutral speech profile within the individual audio stream.

13. The system of claim 7, wherein at least some of the individual vocal-characteristic models are natural-language agnostic.

14. The system of claim 7, wherein the individual vocal-characteristic models, of the plurality of vocal-characteristic models, correspond to individual predefined emotional states of the plurality of predefined emotional states.

15. A computer-implemented method, comprising:
receiving audio data that includes a plurality of audio streams corresponding to a plurality of users that are participating in a multiuser session;
obtaining a user profile associated with a particular user of the plurality of users that are participating in a multiuser session;
obtaining a rule set that defines one or more conditions for analyzing individual audio streams based on a vocal-characteristic model during the multiuser session;
analyzing, during the multiuser session, a particular audio stream associated with the particular user based on a vocal-characteristic model, in response to the user profile associated with the particular user satisfying the one or more conditions; and
performing a remedial action in response to a probability score resulting from analyzing the particular audio stream based on a vocal-characteristic model exceeding a threshold score.

16. The computer-implemented method of claim 15, further comprising:
determining that the user profile associated with the particular user satisfies the one or more conditions based on a reputation score that is defined within the user profile.

17. The computer-implemented method of claim 16, wherein the reputation score for the particular user is determined based on at least one of: a number of complaints defined within the user profile, a number of users that have blocked the particular user, or a number of previous enforcement events defined within the user profile.

18. The computer-implemented method of claim 15, wherein the remedial action includes at least one of: muting the audio stream of the particular user with respect to one or more other users of multiuser session, or terminating a user experience of the particular user for the multiuser session.

19. The computer-implemented method of claim 15, further comprising:
   obtaining a neutral speech profile that corresponds to the particular user; and
   generating the probability score based at least in part on deviations from the neutral speech profile within the particular audio stream.

* * * * *